US010637568B2

(12) United States Patent
Oda et al.

(10) Patent No.: US 10,637,568 B2
(45) Date of Patent: Apr. 28, 2020

(54) TRANSMISSION QUALITY ESTIMATION SYSTEM, TRANSMISSION QUALITY ESTIMATION DEVICE, AND TRANSMISSION QUALITY ESTIMATION METHOD

(71) Applicant: NIPPON TELEGRAPH AND TELEPHONE CORPORATION, Tokyo (JP)

(72) Inventors: Takuya Oda, Yokosuka (JP); Tetsuro Inui, Yokosuka (JP); Akira Hirano, Yokosuka (JP); Wataru Imajuku, Yokosuka (JP); Shoukei Kobayashi, Yokosuka (JP); Takafumi Tanaka, Yokosuka (JP); Yutaka Miyamoto, Yokosuka (JP); Hidehiko Takara, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/777,098

(22) PCT Filed: Nov. 22, 2016

(86) PCT No.: PCT/JP2016/084618
§ 371 (c)(1),
(2) Date: May 17, 2018

(87) PCT Pub. No.: WO2017/090616
PCT Pub. Date: Jun. 1, 2017

(65) Prior Publication Data
US 2018/0337726 A1 Nov. 22, 2018

(30) Foreign Application Priority Data
Nov. 26, 2015 (JP) .................................. 2015-230876

(51) Int. Cl.
*H04B 10/079* (2013.01)
*H04B 10/2581* (2013.01)
(Continued)

(52) U.S. Cl.
CPC ..... *H04B 10/0795* (2013.01); *G02B 6/02042* (2013.01); *H04B 10/077* (2013.01);
(Continued)

(58) Field of Classification Search
None
See application file for complete search history.

(56) References Cited

U.S. PATENT DOCUMENTS 5,867,289 A   2/1999 Gerstel et al.
6,366,347 B1 * 4/2002 Boscher ................ G01M 11/33
                                                356/73.1
(Continued)

FOREIGN PATENT DOCUMENTS

EP      2775636 A1    9/2014
JP    2016/111480 A    6/2016
(Continued)

OTHER PUBLICATIONS

Kavian et al., Intelligent Systems for Optical Networks Design: Advancing Techniques, 2013, Information Science Reference, pp. 83-85 (Year: 2013).*
(Continued)

*Primary Examiner* — Jai M Lee
(74) *Attorney, Agent, or Firm* — Harness, Dickey & Pierce, P.L.C.

(57) ABSTRACT

A transmission quality estimation system includes, three or more nodes and a transmission quality estimation device configured to estimate, transmission quality. A multi-core fiber having a plurality of cores, the multi-core fiber being used in at least a partial segment of a connection between the
(Continued)

nodes. A node of the nodes includes a core connection unit configured to drop, add or relay light transmitted from, to or to each of to the plurality of cores of the multi-core fiber. The transmission quality estimation device includes an estimation unit configured to estimate transmission quality between the nodes on the basis of a transmission quality measurement light dropped by the core connection unit.

17 Claims, 19 Drawing Sheets

(51) Int. Cl.
*H04J 14/00* (2006.01)
*H04B 10/077* (2013.01)
*G02B 6/02* (2006.01)
*H04J 14/02* (2006.01)
*H04B 10/54* (2013.01)

(52) U.S. Cl.
CPC ..... *H04B 10/0775* (2013.01); *H04B 10/2581* (2013.01); *H04B 10/54* (2013.01); *H04J 14/00* (2013.01); *H04J 14/0201* (2013.01); *H04J 14/0216* (2013.01); *H04J 14/0283* (2013.01)

(56) References Cited

U.S. PATENT DOCUMENTS

| | | | | |
|---|---|---|---|---|
| 6,735,395 | B1* | 5/2004 | Bai | H04B 10/504 372/31 |
| 7,711,266 | B1* | 5/2010 | Harris | H04B 10/2569 398/16 |
| 2002/0131115 | A1* | 9/2002 | Kasahara | H04B 10/07953 398/34 |
| 2002/0171885 | A1* | 11/2002 | Rasztovits-Wiech | H04B 10/07953 398/27 |
| 2003/0095736 | A1* | 5/2003 | Kish, Jr. | B82Y 20/00 385/14 |
| 2004/0096216 | A1* | 5/2004 | Ito | H04B 10/0775 398/33 |
| 2004/0179837 | A1* | 9/2004 | Bock | H04B 10/07951 398/25 |
| 2004/0218919 | A1* | 11/2004 | Hunsche | H04B 10/07953 398/27 |
| 2008/0232760 | A1* | 9/2008 | Xia | H04B 10/0775 385/140 |
| 2008/0262359 | A1* | 10/2008 | Tearney | A61B 1/00096 600/476 |
| 2009/0324242 | A1* | 12/2009 | Imamura | G02B 6/02042 398/142 |
| 2011/0274435 | A1* | 11/2011 | Fini | G02B 6/02042 398/139 |
| 2011/0311222 | A1* | 12/2011 | Nakamura | H04B 10/07953 398/26 |
| 2011/0318007 | A1 | 12/2011 | Oikawa | |
| 2012/0177065 | A1 | 7/2012 | Winzer | |
| 2012/0207470 | A1* | 8/2012 | Djordjevic | H04B 10/25 398/44 |
| 2012/0224808 | A1* | 9/2012 | Hayashi | G01M 11/088 385/31 |
| 2012/0250008 | A1* | 10/2012 | Hayashi | G01M 11/335 356/73.1 |
| 2013/0016949 | A1* | 1/2013 | Yao | G02B 6/02042 385/126 |
| 2013/0070786 | A1* | 3/2013 | Liu | C02F 1/78 370/464 |
| 2013/0077967 | A1* | 3/2013 | Woodward | H04J 14/04 398/44 |
| 2013/0236175 | A1* | 9/2013 | Sethumadhavan | H04J 14/04 398/55 |
| 2013/0271771 | A1* | 10/2013 | Sasaoka | G01B 9/02049 356/477 |
| 2013/0302002 | A1* | 11/2013 | Imamura | G02B 6/02042 385/127 |
| 2014/0140694 | A1* | 5/2014 | Zhou | H04J 14/02 398/44 |
| 2014/0240819 | A1* | 8/2014 | Tsuchida | G02B 6/02042 359/341.33 |
| 2015/0078744 | A1* | 3/2015 | Ito | H04J 14/04 398/43 |
| 2015/0168642 | A1* | 6/2015 | Mimura | H01S 3/06737 359/341.3 |
| 2015/0177134 | A1* | 6/2015 | Ito | G01N 21/474 356/446 |
| 2015/0229438 | A1* | 8/2015 | Le Taillandier De Gabory | H04B 10/2581 398/182 |
| 2016/0056889 | A1* | 2/2016 | Le Taillandier De Gabory | H04L 25/14 398/16 |
| 2018/0375579 | A1* | 12/2018 | Oda | G02B 6/26 |

FOREIGN PATENT DOCUMENTS

| | | |
|---|---|---|
| JP | 2016/225900 A | 12/2016 |
| WO | WO-2013/157245 A1 | 10/2013 |
| WO | WO-2013/179604 A1 | 12/2013 |
| WO | WO-2014/141533 A1 | 9/2014 |

OTHER PUBLICATIONS

Paschotta, Rudiger, Encyclopedia of Laser Physics and Technology, 2012 (Year: 2012).*
Medhi, Von Neumann Architecture, 2012 (Year: 2012).*
International Search Report issued in PCT/JP2016/084618, ISA/JP, Tokyo, dated Jan. 10, 2017.
Shinji Matsuoka, Ultrahigh-speed Ultrahigh-capacity Transport Network Technology for Cost-effective Core and Metro Networks, NTT Technical Journal, Mar. 2011, pp. 8-12 with English version.
Yutaka Miyamoto and Hirokazu Takenouchi, Dense Space-division-multiplexing Optical Communications Technology for Petabit-per-second Class Transmission, NTT Technical Journal, Aug. 2014, pp. 52-56 with English version.
Kazuyuki Shiraki, R&D Trends in Optical Fiber and Cable Technology, NTT Technical Journal, Jan. 2015, pp. 59-63, with English version.
R. R. Thomson, et al., "Ultrafast-laser inscription of a three dimensional fan-out device for multicore fiber coupling applications", Optics Express, OSA Publishing, Sep. 2007, vol. 15, No. 18, pp. 11691-11697.
W. Klaus, et al., "Free-Space Coupling Optics for Multicore Fibers", Photonics Technology Letters, IEEE, Nov. 2012, vol. 24, No. 21, pp. 1902-1905.
Notice of Allowance regarding Japanese Application No. 2017-552667, dated Feb. 26, 2019.
Extended European Search Report regarding EPSN 168685592, dated Jun. 19, 2019.

* cited by examiner

TRANSMISSION QUALITY ESTIMATION SYSTEM, TRANSMISSION QUALITY ESTIMATION DEVICE, AND TRANSMISSION QUALITY ESTIMATION METHOD

TECHNICAL FIELD

The present invention relates to a transmission quality estimation system, a transmission quality estimation device, and a transmission quality estimation method.

This application is a 371 National Phase of PCT/JP2016/084618, filed on Nov. 22, 2016. Priority is claimed on Japanese Patent Application No. 2015-230876, filed Nov. 26, 2015. The content of both applications is incorporated herein by reference.

BACKGROUND ART

A communication network that uses optical fibers is constructed in a core network that connects together metropolises and a metro network that connects together bases in an area. In such a network, a plurality of optical fibers are used in a bundle. Wavelength division multiplexing (WDM) transmission that involves multiplexing a plurality of optical signals having different wavelengths is performed on respective individual optical fibers to realize high-capacity signal transmission (for example, see Non-Patent Literature 1). In order to further increase the transmission capacity, the use of a multi-core fiber (MCF) which is an optical fiber having a plurality of cores instead of an optical fiber (single core fiber: SCF) having one core has been discussed (for example, see Non-Patent Literatures 2 and 3).

CITATION LIST

Non-Patent Literature

Non-Patent Literature 1

Shinji Matsuoka, "Ultrahigh-speed Ultrahigh-capacity Transport Network Technology for Cost-effective Core and Metro Networks", NTT Technical Journal, March 2011, pages 8-12

Non-Patent Literature 2

Yutaka Miyamoto and Hirokazu Takenouchi, "Dense Space-division-multiplexing Optical Communications Technology for Petabit-per-second Class Transmission", NTT Technical Journal, August 2014, pages 52-56

Non-Patent Literature 3

Kazuyuki Shiraki, "R&D Trends in Optical Fiber and Cable Technology", NTT Technical Journal. January 2015, pages 59-63

SUMMARY OF INVENTION

Technical Problem

In multi-core fibers, a plurality of cores are present in one fiber. Due to this, each core is influenced by crosstalk from other surrounding cores in the same fiber. Since crosstalk has an influence on the quality of signal transmission, it is necessary to monitor transmission quality.

In view of the above-described problems, an object of the present invention is to provide a transmission quality estimation system, a transmission quality estimation device, and a transmission quality estimation method capable of estimating transmission quality of communication which uses an multi-core fiber.

Solution to Problem

A transmission quality estimation system according to a first aspect of the present invention is a transmission quality estimation system which includes: three or more nodes; and a transmission quality estimation device configured to estimate transmission quality, wherein a multi-core fiber having a plurality of cores, the multi-core fiber being used in at least a partial segment of a connection between the nodes. A node of the nodes includes: a core connection unit configured to drop, add or relay light transmitted from, to or to each of the plurality of cores of the multi-core fiber, and the transmission quality estimation device includes: an estimation unit configured to estimate transmission quality between the nodes on the basis of a transmission quality measurement light dropped by the core connection unit.

According to a second aspect of the present invention, in the transmission quality estimation system according to the first aspect, the multi-core fiber includes the core configured to transmit a communication optical signal and the core configured to transmit the transmission quality measurement light.

According to a third aspect of the present invention, in the transmission quality estimation system according to the second aspect, the communication optical signal is modulated such that the core used for transmission can be identified.

According to a fourth aspect of the present invention, in the transmission quality estimation system according to the third aspect, the communication optical signal is modulated such that the core used for transmission can be identified by intensity modulation having a modulation period longer than a modulation period when signals transmitted by the communication optical signal are generated.

According to a fifth aspect of the present invention, in the transmission quality estimation system according to the fourth aspect, the intensity modulation is performed on an electrical signal used for generating the communication optical signal.

According to a sixth aspect of the present invention, in the transmission quality estimation system according to the fourth aspect, the intensity modulation is performed after the communication optical signal is generated on the basis of an electrical signal.

According to a seventh aspect of the present invention, in the transmission quality estimation system according to the second to sixth aspects, the estimation unit uses a communication wavelength range in estimation of the transmission quality.

According to an eighth aspect of the present invention, in the transmission quality estimation system according to the first aspect, the multi-core fiber includes the core configured to transmit the communication optical signal and light in a wavelength range other than a communication wavelength range and the core configured to transmit the transmission quality measurement light.

According to a ninth aspect of the present invention, in the transmission quality estimation system according to the first aspect, one core of the plurality of cores is used for transmitting the communication optical signal and the transmission quality measurement light.

According to a tenth aspect of the present invention, in the transmission quality estimation system according to the eighth or ninth aspect, the estimation unit uses a wavelength range other than a communication network in estimation of the transmission quality.

A transmission quality estimation device according to an eleventh aspect of the present invention is a transmission quality estimation device in a transmission quality estimation system which includes three or more nodes and the transmission quality estimation device configured to estimate transmission quality and in which a multi-core fiber having a plurality of cores, the multi-core fiber being used in at least a partial segment of a connection between the nodes, the transmission quality estimation device including: a receiving unit configured to receive a transmission quality measurement light dropped from some of the plurality of cores of the multi-core fiber, and an estimation unit configured to estimate transmission quality between the nodes on the basis of the transmission quality measurement light.

A transmission quality estimation method according to a twelfth aspect of the present invention is a transmission quality estimation method executed by a transmission quality estimation system which includes three or more nodes and a transmission quality estimation device configured to estimate transmission quality and in which a multi-core fiber having a plurality of cores, the multi-core fiber being used in at least a partial segment of a connection between the nodes, the transmission quality estimation method including: a core connection step of performing, by a core connection unit of a node of the nodes, dropping, adding, or relaying light transmitted from, to or to each of the plurality of cores of the multi-core fiber, and an estimation step of estimating, by the transmission quality estimation device, transmission quality between the nodes on the basis of a transmission quality measurement light dropped by the core connection unit.

Advantageous Effects of Invention

According to the present invention, it is possible to estimate transmission quality of communication that uses a multi-core fiber.

DESCRIPTION OF EMBODIMENTS

Figure 1:
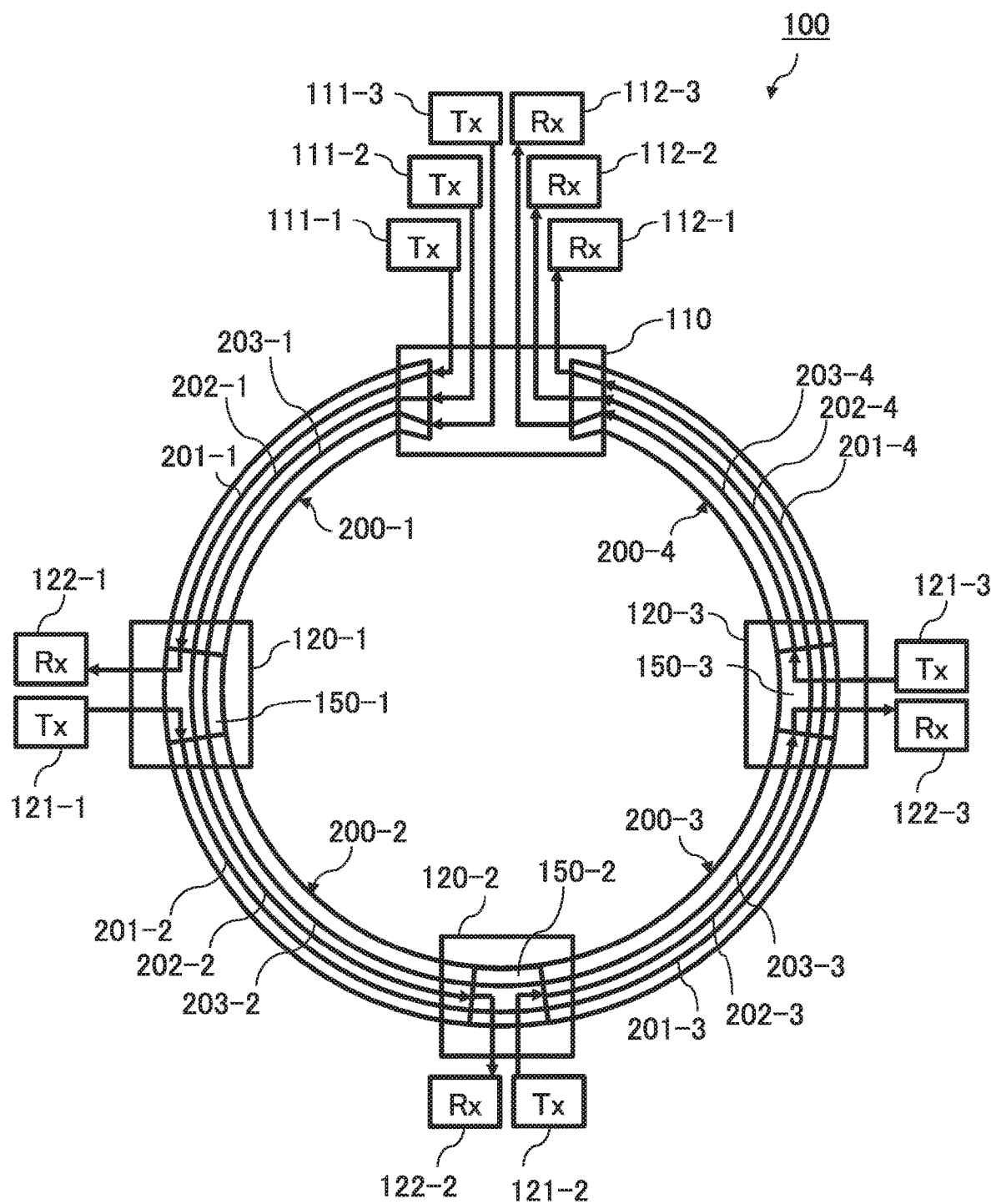
FIG. 1 is a diagram showing a first configuration example of a communication system to which an embodiment of the present invention can be applied.

Hereinafter, an embodiment of the present invention will be described with reference to the drawings. In the following embodiments, elements denoted by the same reference numerals perform similar operations and a redundant description thereof will be omitted appropriately.

First, a communication system to which an embodiment of the present invention can be applied will be described.

FIG. 1 is a diagram showing a configuration example of a communication system 100 to which an embodiment of the present invention can be applied. The communication system 100 includes a transceiving node 110 and n Add/Drop nodes 120, n being an integer of 1 or more. FIG. 1 shows a configuration example of the communication system 100 when n=3. In the following description, the respective n Add/Drop nodes 120 will be referred to as Add/Drop nodes 120-1 to 120-$n$. Moreover, the transceiving node 110 and the Add/Drop node 120 will be collectively referred to as a "node". In the following description, a transmitting device, a receiving device, a transceiving device, and the like that perform communication using optical signals and nodes will be described as individual configurations. However, a node may include a transmitting device, a receiving device, a transceiving device, and the like.

Nodes are connected together by multi-core fibers (MCFs) 200-1 to 200-4. The communication system 100 has a physical topology of a single-system one-way ring configuration in which the nodes are connected together by the MCFs 200-1 to 200-4. The transceiving node 110 and the Add/Drop node 120-1 are connected together by the MCF 200-1. The Add/Drop node 120-1 and the Add/Drop node 120-2 are connected together by the MCF 200-2. The Add/Drop node 120-2 and the Add/Drop node 120-3 are connected together by the MCF 200-3. The Add/Drop node 120-3 and the transceiving node 110 are connected together by the MCF 200-4. Each of the MCFs 200-1 to 200-4 of the communication system 100 has three cores 201, 202, and 203.

To generalize the description of the configuration of the communication system 100, an Add/Drop node 120-$i$ ($1 \leq i \leq n-1$) is connected to an Add/Drop node 120-($i$+1) by an MCF 200-($i$+1). The MCF 200-1 connects together the transceiving node 110 and the Add/Drop node 120-1. The MCF 200-($n$+1) connects together the Add/Drop node 120-$n$ and the transceiving node 110.

Each node of the communication system 100 includes a transmitting device (Tx) and a receiving device (Rx) that perform communication between the nodes. Transmitting devices 111-1 to 111-3 and receiving devices 112-1 to 112-3 are provided in the transceiving node 110. A transmitting device 121-1 and a receiving device 122-1 are provided in the Add/Drop node 120-1. A transmitting device 121-2 and a receiving device 122-2 are provided in the Add/Drop node 120-2. A transmitting device 121-3 and a receiving device 122-3 are provided in the Add/Drop node 120-3. The transmitting devices 111-1 to 111-3 generate optical signals to be transmitted to the Add/Drop nodes 120-1 to 120-3, respectively. The receiving devices 112-1 to 112-3 receive optical signals transmitted from the Add/Drop nodes 120-1 to 120-3 and acquire information included in the optical signals. The transmitting devices 121-1 to 121-3 generate optical signals to be transmitted to the transceiving node 110. The receiving devices 122-1 to 122-3 receive optical signals transmitted from the transceiving node 110 and acquire information included in the optical signals.

The transmitting devices 111-1 to 111-3 generate optical signals addressed to the Add/Drop nodes 120-1 to 120-3, respectively. The three optical signals generated by the transmitting devices 111-1 to 111-3 are added to the cores 201-1 to 203-1 of the MCF 200-1, respectively. The receiving devices 112-1 to 112-3 receive optical signals transmitted from the Add/Drop nodes 120-1, 120-2, and 120-3 to nodes included in the receiving devices, respectively. The receiving devices 112-1 to 112-3 receive optical signals from the Add/Drop nodes 120-1 to 120-3 via the cores 201-4 to 203-4 of the MCF 200-4. A fan-in device or a fan-out device is used for adding optical signals to the MCF 200 and dropping optical signals from the MCF 200 in the transceiving node 110.

The fan-in device is a device which is connected to each of the cores in a multi-core fiber and which adds optical signals to the cores. The fan-out device is a device which is connected to each of the cores in a multi-core fiber and which drops each of optical signals propagating through the cores. Since the only difference between the devices is that the propagating directions of optical signals are different, input and output of optical signals to and from a multi-core fiber may be performed using any one of the fan-in device and the fan-out device. Moreover, adding of optical signals addressed to a multi-core fiber and dropping of optical signals from the multi-core fiber may be performed simultaneously using one device.

Connectors 150-1 to 150-3 are provided in the Add/Drop nodes 120-1 to 120-3, respectively. A connector 150-$i$ of an Add/Drop node 120-$i$ ($i$=1, 2, 3) is connected to an MCF 200-$i$ and an MCF 200-($i$+1). A connector 150-$i$ drops an optical signal addressed to a subject node among the optical signals added in the transceiving node 110 from the MCF 200-$i$. Moreover, the connector 150-$i$ adds optical signals addressed to the transceiving node 110 to the cores of the MCF 200-($i$+1).

In the Add/Drop node 120-1, the connector 150-1 drops an optical signal addressed to the subject node from the core 201-1 of the MCF 200-1. The connector 150-1 connects the dropped optical signal to the receiving device 122-1. Moreover, the connector 150-1 adds an optical signal generated by the transmitting device 121-1 to the core 201-2 of the MCF 200-2. The optical signal added to the core 201-2 is an optical signal transmitted from the Add/Drop node 120-1 to the transceiving node 110.

The connector 150-1 connects the cores 202-1 and 203-1 among the cores of the MCF 200-1 to the cores 202-2 and 203-2 among the cores of the MCF 200-2. The connector 150-1 relays optical signals between the MCF 200-1 and the MCF 200-2. The connector 150-1 relays optical signals transmitted through cores other than the cores 201-1 and 201-2 that add or drop optical signals.

In the Add/Drop node 120-2, the connector 150-2 drops an optical signal addressed to the subject node from the core 202-2 of the MCF 200-2. The connector 150-2 connects the dropped optical signal to the receiving device 122-2. Moreover, the connector 150-2 adds an optical signal generated by the transmitting device 121-2 to the core 202-3 of the MCF 200-3. The optical signal added to the core 202-3 is an optical signal transmitted from the Add/Drop node 120-2 to the transceiving node 110.

The connector 150-2 connects the cores 201-2 and 203-2 among the cores of the MCF 200-2 to the cores 201-3 and 203-3 among the cores of the MCF 200-3. The connector 150-2 relays optical signals between the MCF 200-2 and the MCF 200-3. The connector 150-2 relays optical signals transmitted through cores other than the cores 201-2 and 201-3 that add or drop optical signals.

In the Add/Drop node 120-3, the connector 150-3 drops an optical signal addressed to the subject node from the core 203-3 of the MCF 200-3. The connector 150-3 connects the dropped optical signal to the receiving device 122-3. Moreover, the connector 150-3 adds an optical signal generated by the transmitting device 121-3 to the core 203-4 of the MCF 200-4. The optical signal added to the core 203-4 is an optical signal transmitted from the Add/Drop node 120-3 to the transceiving node 110.

The connector 150-3 connects the cores 201-3 and 202-3 among the cores of the MCF 200-3 to the cores 201-4 and 202-4 among the cores of the MCF 200-4. The connector 150-3 relays optical signals between the MCF 200-3 and the MCF 200-4. The connector 150-3 relays optical signals transmitted through cores other than the cores 203-3 and 203-4 that add or drop optical signals.

Figure 2A:
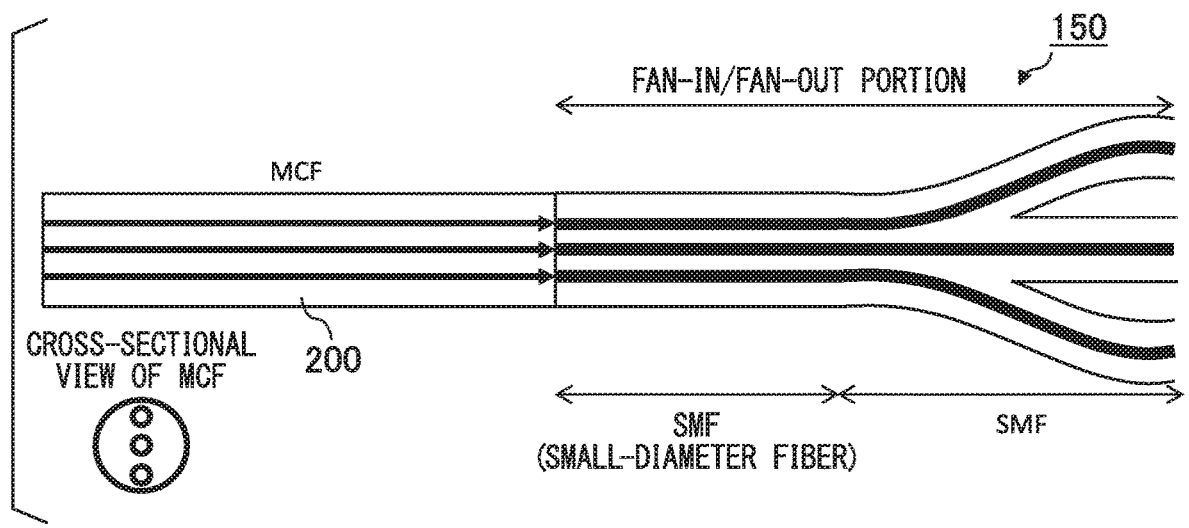
FIG. 2A is a diagram showing a first configuration example of a connector used in a communication system.
Figure 2B:
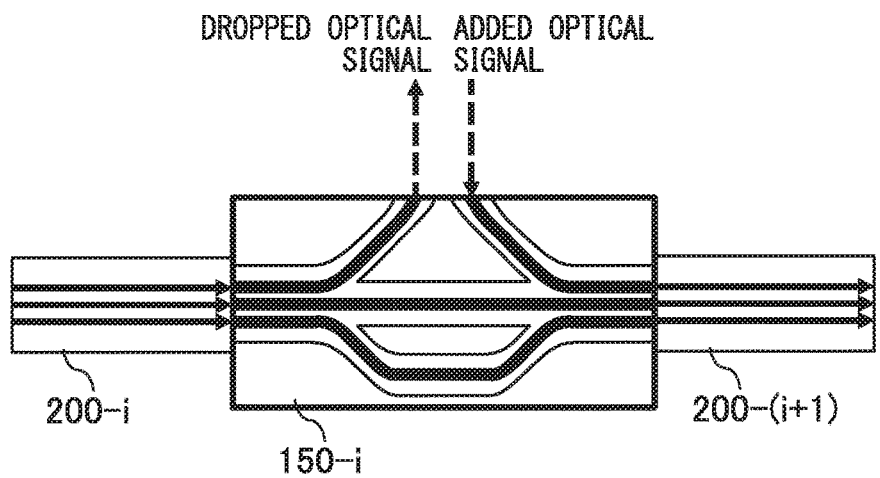
FIG. 2B is a diagram showing a first configuration example of a connector used in a communication system.

FIGS. 2A and 2B are diagrams showing a first configuration example of the connector 150 used in the communication system 100. The connector 150 includes a fan-in/fan-out portion including a plurality of small-diameter single-mode fibers (SMFs) and a plurality of SMFs. As shown in FIG. 2A, the connector 150 includes a small-diameter SMF for each of the cores of a connection target MCF 200. One set of ends of the plurality of small-diameter SMFs are provided at positions facing the cores of the MCF 200. Moreover, the other set of ends of the plurality of small-diameter SMFs are provided at positions facing one set of ends of the SMFs. Each of the small-diameter SMFs connects together the SMF and the core of the MCF 200. The connector 150 can drop optical signals transmitted through the respective cores of the MCF 200 via the small-diameter SMF and the SMF. Moreover, by inputting optical signals to the SMF, it is possible to input optical signals to the cores of the MCF 200.

The connector 150-$i$ shown in FIG. 2B connects together the MCF 200-$i$ and the MCF 200-($i$+1). The other set of ends of SMFs corresponding to cores that transmit optical signals that are an Add/Drop target are drawn out to a side surface of the connector 150-$i$. At the other set of ends of the SMFs drawn out to the side surface of the connector 150-$i$, adding and dropping (Add/Drop) of the optical signal can be performed.

The other set of ends of the SMFs corresponding to cores that transmit optical signals that are not the Add/Drop target among the cores of the MCF 200-$i$ and the other set of ends of the SMFs corresponding to cores that transmit optical signals that are not the Ad/Drop target among the cores of the MCF 200-($i$+1) are provided at positions facing each other. In the connector 150-$i$, optical signals that are not the Add/Drop target are relayed from the MCF 200-$i$ to the MCF 200-($i$+1) via the small-diameter SMFs and the SMFs.

Figure 3A:
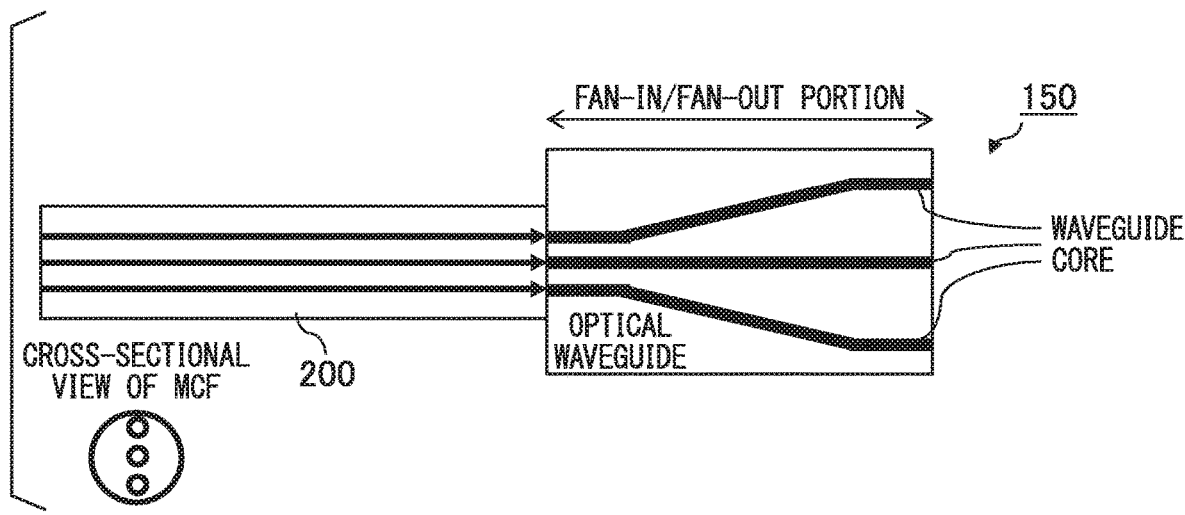
FIG. 3A is a diagram showing a second configuration example of a connector used in a communication system.
Figure 3B:
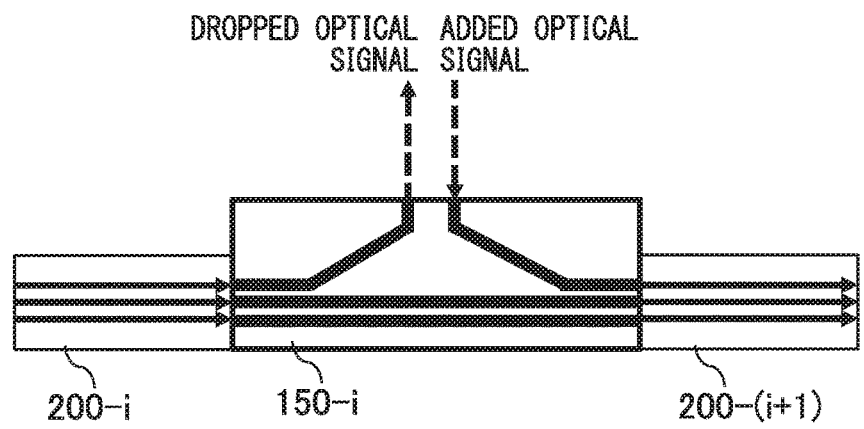
FIG. 3B is a diagram showing the second configuration example of a connector used in a communication system.

FIGS. 3A and 3B are diagrams showing a second configuration example of the connector 150 used in the communication system 100. FIGS. 3A and 3B show a configuration example different from the configuration example of the connector 150 shown in FIGS. 2A and 2B. The connector 150 shown in FIGS. 3A and 3B includes an optical waveguide including a plurality of waveguide cores formed on a glass substrate as a fan-in/fan-out portion. As shown in FIG. 3A, in the connector 150, the plurality of waveguide cores are provided at positions facing the cores of a connection target MCF 200. Optical signals transmitted through the respective cores of the MCF 200 are split via the waveguide cores. Moreover, by adding optical signals to the waveguide cores, it is possible to input optical signals to the respective cores of the MCF 200.

In the connector 150-$i$ shown in FIG. 3B, one set of ends of waveguide cores corresponding to the cores that transmit optical signals that are the Add/Drop target among the cores of the MCF 200-$i$ and the MCF 200-($i$+1) connected together by the connector 150-$i$ are provided at positions facing the cores of the MCFs. The other set of ends of the waveguide cores are provided on a side surface of the connector 150-$i$. At the other set of ends of the waveguide cores positioned on the side surface of the connector 150-$i$, adding and dropping of optical signals can be performed.

One set of ends of the waveguide cores corresponding to the cores that transmit optical signals that are not the Add/Drop target among the cores of the MCF 200-$i$ are provided al positions facing the cores of the MCFs. The other set of ends of the waveguide cores are provided al positions facing the cores that transmit optical signals dial are not the Add/Drop target among the cores of the MCF 200-($i$+1). The cores that transmit optical signals that are not the Add/Drop target in the MCF 200-$i$ and the MCF 200-($i$+1) are connected to waveguide cores in a one-to-one relationship. In the connector 150-$i$, the optical signals that are not the Add/Drop target are relayed from the cores of the MCF 200-$i$ to the cores of the MCF 200-($i$+1) via the waveguide cores.

The waveguide cores may be formed in a three-dimensional space as disclosed in Reference Document 1 as well as being formed in a two-dimensional space of a substrate plane.

Reference Document 1

R. R. Thomson, et al, "Ultrafast-laser inscription of a three dimensional fan-out device for multi-core fiber coupling applications". Optics Express, OSA Publishing, 2007, Vol 15, Issue 18, p. 11691-11697

Figure 4A:
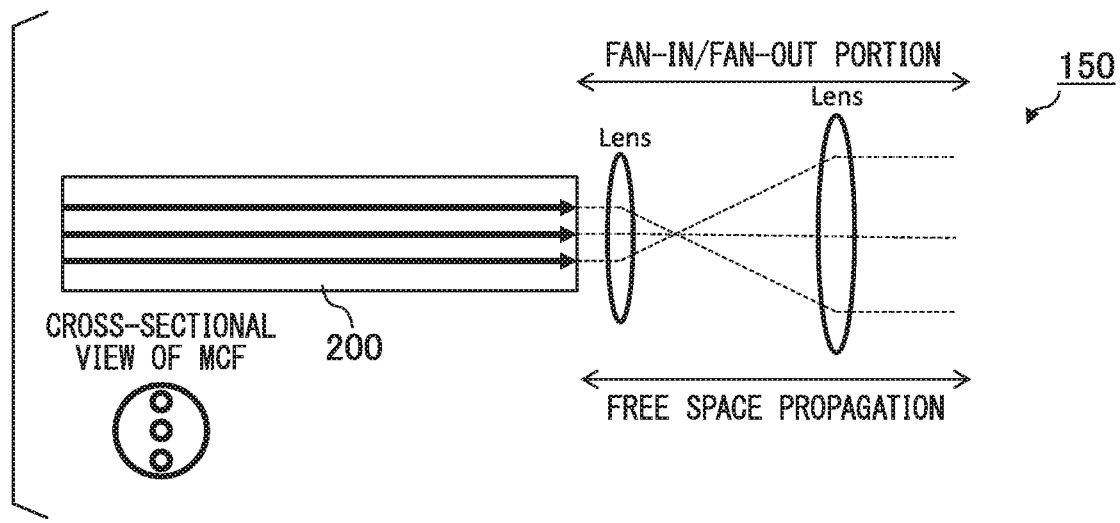
FIG. 4A is a diagram showing a third configuration example of a connector used in a communication system.
Figure 4B:
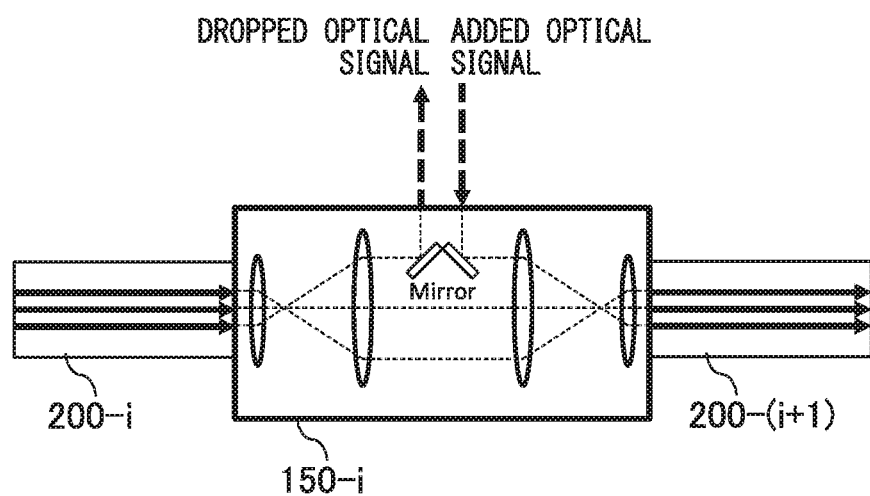
FIG. 4B is a diagram showing the third configuration example of a connector used in a communication system.

FIGS. 4A and 4B are diagrams showing a third configuration example of the connector 150 used in the communication system 100. FIGS. 4A and 4B show a configuration example different from the configuration example of the connector 150 shown in FIGS. 2A, 2B, 3A, and 3B. The connector 150 shown in FIGS. 4A and 4B causes optical signals transmitted through the respective cores of the MCF 200 to be output to a free space and causes the optical signals of the respective cores in the free space in be split by an optical system. For example, as shown in FIG. 4A, the connector 150 includes a fan-in/fan-out portion formed of two lenses. The optical signals transmitted through the respective cores of the MCF 200 are output to the free space and are split by being refracted by the two lenses. Add/Drop of optical signals is performed using an optical system. Connection of two MCFs 200 via a free space is disclosed in Reference Document 2, for example.

Reference Document 2

W. Klaus, et al, "Free-Space Coupling Optics for Multicore Fibers," Photonics Technology Letters, IEEE, September 2012, Volume 24, Issue 21, p. 1902-1905

FIG. 4B is a diagram showing a configuration example of the connector 150-$i$. In the connector 150-$i$ shown in FIG. 4B, the optical signals output from the respective cores of the MCF 200-$i$ are collimated by an optical system (a collimator) formed by combining two lenses. Moreover, the collimated optical signals are input to the respective cores of the MCF 200-($i$+1). A mirror that changes an optical path toward a side surface of the connector 150-$i$ is disposed in an optical path of optical signals that are the Add/Drop target. A splitting target optical signal among the optical signals that are converted to parallel light by the optical system is reflected from a mirror and is dropped to the outside of the connector 150-$i$, whereby the splitting target optical signal can be obtained. Moreover, by causing optical signals input from the outside of the connector 150-$i$ to strike the mirror, the optical signals reflected from the mirror are incident on the optical system obtained by combining two lenses together with the collimated optical signals. When the optical signals incident on the optical system are connected to the cores of the MCF 200-($i$+1), Add target optical signals can be added to the cores.

Optical signals that are not the Add/Drop target are bundled together with the added optical signals after being split by the optical system and are input to the respective cores of the MCF 200-($i$+1). In the connector 150-$i$, the optical signals that are not the Add/Drop target are relayed from the MCF 200-$i$ to the MCF 200-($i$+1) via a free space. Although two lenses are used for collimating light output from the fiber and a mirror is used for changing the propagating direction of light in the free space in the drawings, an optical device having the same function may be used.

Although FIGS. 2A, 2B, 3A, 3B, 4A, and 4B show a configuration example of the connector 150, the connector 150 may be realized using a medium and a method other than those described above. For example, a planar lightwave circuit (PIC) having an optical waveguide formed on a silicon may be used as a connector.

In the communication system 100, optical signals generated by the transmitting device 111-1 of the transceiving node 110 are received by the receiving device 122-1 of the Add/Drop node 120-1 via the core 201-1 of the MCF 200-1 and the connector 150-1. The optical signals generated by the transmitting device 111-2 are received by the receiving device 122-2 of the Add/Drop node 120-2 via the core 202-1 of the MCF 200-1, the connector 150-1, the core 202-2 of the MCF 200-2, and the connector 150-2. The optical signals generated by the transmitting device 111-3 are received by the receiving device 122-3 of the Add/Drop node 120-3 via the core 203-1 of the MCF 200-1, the connector 150-1, the core 203-2 of the MCF 200-2, the connector 150-2, the core 203-3 of the MCF 200-3, and the connector 150-3.

Moreover, the optical signals generated by the transmitting device 121-1 of the Add/Drop node 120-1 are received by the receiving device 112-1 of the transceiving node 110 via the connector 150-1, the core 201-2 of the MCF 200-2, the connector 150-2, the core 201-3 or the MCF 200-3, the connector 150-3, and the core 201-4 of the MCF 200-4. The optical signals generated by the transmitting device 121-2 of the Add/Drop node 120-2 are received by the receiving device 112-2 of the transceiving node 110 via the connector 150-2, the core 202-3 of the MCF 200-3, the connector 150-3, and the core 202-4 of the MCF 200-4. The optical signals generated by the transmitting device 121-3 of the Add/Drop node 120-3 are received by the receiving device 112-3 of the transceiving node 110 via the connector 150-3 and the core 203-4 of the MCF 200-1.

In the communication system 100, the transceiving node 110 has communication paths for transmitting and receiving signals to and from the Add/Drop nodes 120-1 to 120-3. The communication system 100 has a star-type logical topology around the transceiving node 110.

For example, by connecting together the MCFs 200 at each node using any one of the connectors 150 shown in FIGS. 2A, 2B, 3A, 3B, 4A, and 4B, it is possible to add and drop optical signals to and from predetermined cores among a plurality of cores included in the MCF 200. In the communication system 100, by connecting the MCF 200-$i$ and the MCF 200-($i$+1) via the connector 150-$i$, it is possible to easily drop optical signals addressed to the Add/Drop node 120-$i$ and add optical signals addressed to the transceiving node 110. Since a process of dividing multiplexed optical signals having different wavelengths in respective wavelengths is not required in adding or dropping optical signals, it is possible to reduce the time and labor for installation and maintenance of devices in the Add/Drop node 120.

Although a case in which the MCF 200 has three cores has been described, the MCF 200 may have four or more cores. When the MCF 200 has four or more cores, optical signals may be added and dropped for two or more cores of the Add/Drop node 120.

Figure 5:
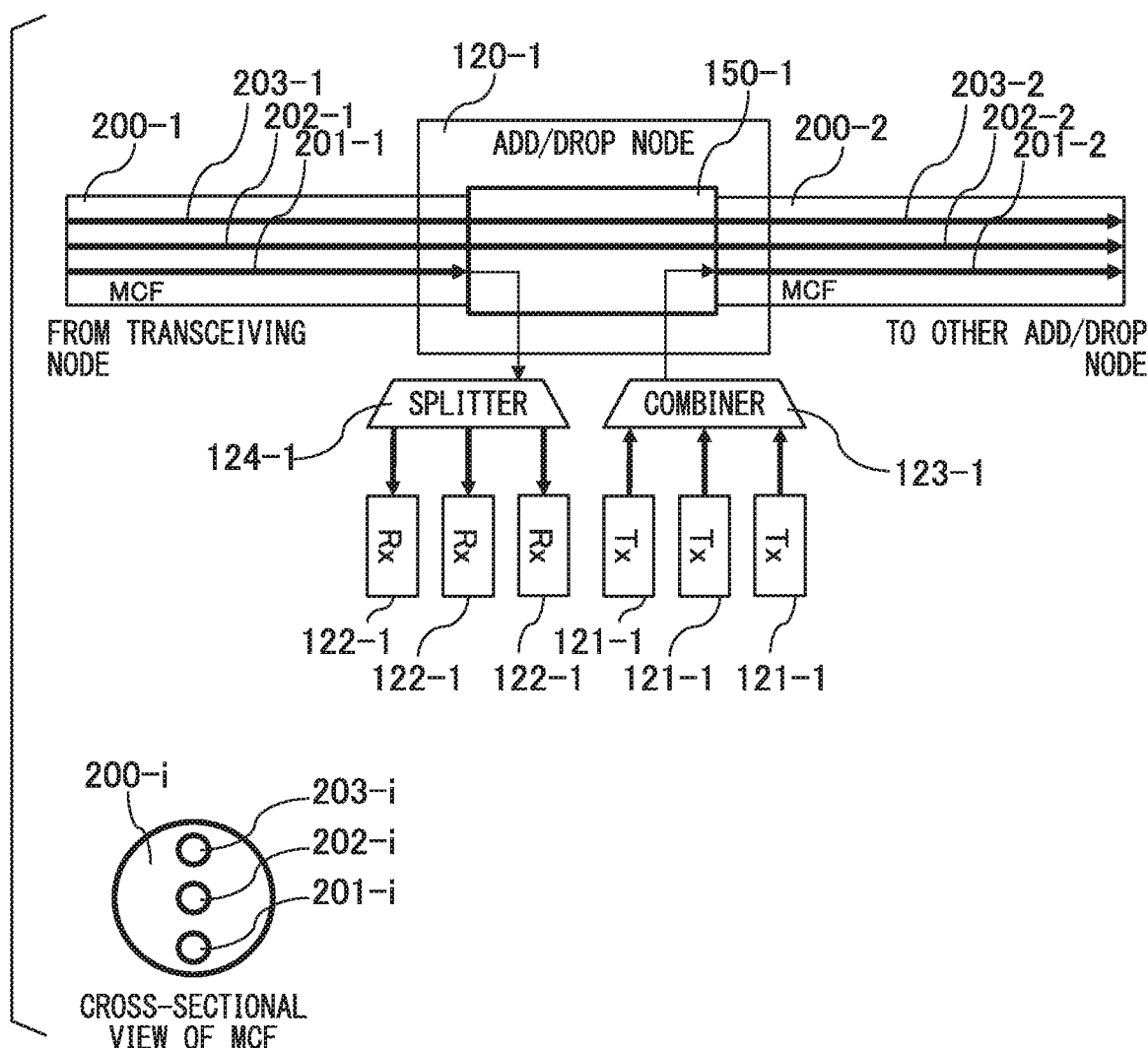
FIG. 5 is a diagram showing a first configuration example of an Add/Drop node when WDM transmission is performed in a communication system.

Moreover, WDM transmission may be performed in each core of the MCF 200. When WDM transmission is performed, optical signals of respective wavelengths need to be split and combined in the Add/Drop node 120. FIG. 5 is a diagram showing a configuration example of the Add/Drop node 120-1 when the communication system 100 performs WDM transmission. The Add/Drop node 120-1 includes a connector 150-1, a splitter 124-1, a combiner 123-1, a plurality of receiving devices 122-1, and a plurality of transmit ling devices 121-1.

An optical signal dropped from the core 201-1 of the MCF 200-1 of the connector 150-1 is input to the splitter 124-1. The splitter 124-1 splits the input optical signal in respective wavelengths. The optical signals obtained by splitting are received by the receiving devices 122-1, respectively. The optical signals having different wavelengths generated by the plurality of transmitting devices 121-1 are input to the combiner 123-1. The combiner 123-1 combines the input optical signals and outputs the combined optical signal to the connector 150-1. The connector 150-1 connects the optical signal input from the combiner 123-1 to the core 201-2 of the MCF 200-2 to add the optical signal addressed to the transceiving node 110 to the MCF 200-2.

Even when WDM transmission is performed, the optical signals of the cores 202-1 and 203-1 of the MCF 200-1, which are not the Add/Drop target, are relayed to the cores 202-2 and 203-2 of the MCF 200-2. Due to this, as for optical signals to be relayed, it is not necessary to split and combine optical signals in respective wavelengths at each Add/Drop node. When WDM transmission is performed, the other Add/Drop nodes 120 have a configuration similar to that of the Add/Drop node 120-1.

Figure 6:
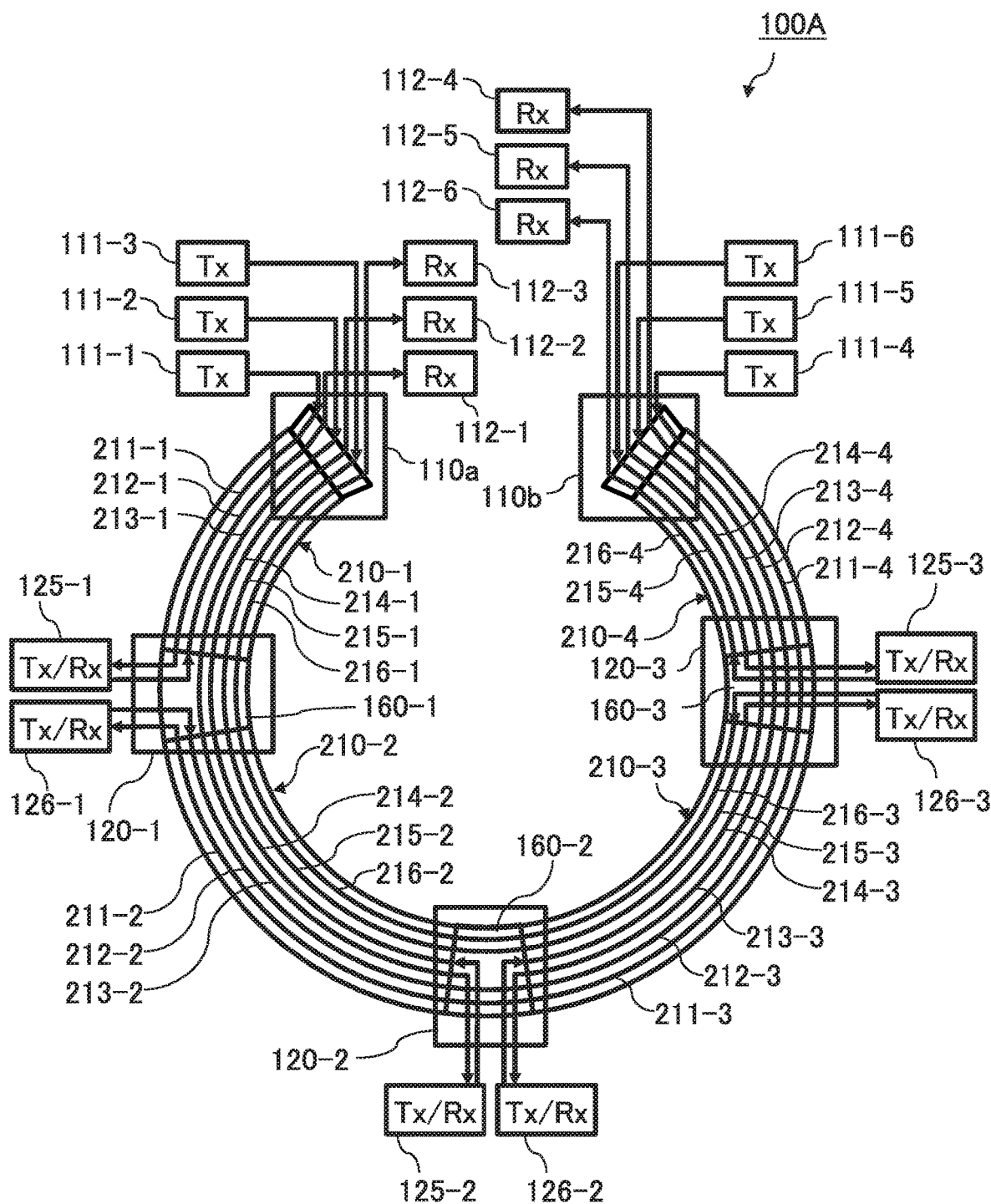
FIG. 6 is a diagram showing a second configuration example of a communication system to which an embodiment of the present invention can be applied.

FIG. 6 is a diagram showing a configuration example of a communication system 100A to which an embodiment of the present invention can be applied. The communication system 100A includes transceiving nodes 110$a$ and 110$b$ and n Add/Drop nodes 120. FIG. 6 shows a configuration example of the communication system 100A when n=3. The communication system 100A is different from the communication system 100 shown in FIG. 1 in that the communication system 100A has a physical topology of a dual-system one-way ring configuration.

Nodes are connected together by MCFs 210-1 to 210-4. The transceiving node 110$a$ and the Add/Drop node 120-1 are connected together by the MCF 210-1. The Add/Drop node 120-1 and the Add/Drop node 120-2 are connected together by the MCF 210-2. The Add/Drop node 120-2 and the Add/Drop node 120-3 are connected together by the MCF 210-3. The Add/Drop node 120-3 and the transceiving node 110$b$ are connected together by the MCF 210-4. The MCFs 210-1 to 210-4 of the communication system 100A include six cores 211 to 216.

When the description of the configuration of the communication system 100A is generalized, an Add/Drop node 120-$i$ (1≤$i$≤n−1) is connected to an Add/Drop node 120-($i$+1) by an MCF 210-($i$+1). The MCF 210-1 connects together the transceiving node 110$a$ and the Add/Drop node 120-1. The MCF 210-($n$+1) connects together the Add/Drop node 120-$n$ and the transceiving node 110$b$.

Each node of the communication system 100A includes either a transmitting device (Tx) and a receiving device (Rx) that perform communication between nodes or a transceiving device (Tx/Rx). Transmitting devices 111-1 to 111-3 and receiving devices 112-1 to 112-3 are provided in the transceiving node 110$a$. Transceiving devices 125-1 and 126-1 are provided in the Add/Drop node 120-1. Transceiving devices 125-2 and 126-2 are provided in the Add/Drop node 120-2. Transceiving devices 125-3 and 126-3 are provided in the Add/Drop node 120-3. Transmitting devices 111-4 to 111-6 and receiving devices 112-4 to 112-6 are provided in the transceiving node 110$b$. In the configuration example of the communication system 100A shown in FIG. 6, a configuration in which the transmitting device 111 and the receiving device 112 are provided in the transceiving nodes 110a and 110b, and the transceiving devices 125 and 126 are provided in the Add/Drop nodes 120-1 to 120-3 will be described. However, the transceiving devices 125 and 126 have the functions of both a transmitting device and a receiving device therein, and there is no great difference between the transceiving device and a combination of the transmitting device and the receiving device. Either a transmitting device and a receiving device or a transceiving device may be provided in the transceiving nodes 110a and 110b and the Add/Drop nodes 120-1 to 120-3.

The transmitting devices 111-1 to 111-3 generate optical signals to be transmitted to the Add/Drop nodes 120-1 to 120-3, respectively. The optical signals generated by the transmitting devices 111-1 to 111-3 are added to the cores 211-1, 213-1, and 215-1 of the MCF 210-1, respectively. The receiving devices 112-1 to 112-3 receive optical signals transmitted from the Add/Drop nodes 120-1 to 120-3 to the transceiving node 110a, respectively. The receiving devices 112-1 to 112-3 receive optical signals from the cores 212-1, 214-1, and 216-1 of the MCF 210-1, respectively.

The transmitting devices 111-4 to 111-6 generate optical signals to be transmitted to the Add/Drop nodes 120-1 to 120-3, respectively. The optical signals generated by the transmitting devices 111-4 to 111-6 are added to the cores 211-4, 213-4, and 215-4 of the MCF 210-4, respectively. The receiving devices 112-4 to 112-6 receive optical signals transmitted from the Add/Drop nodes 120-1 to 120-3 to the transceiving node 110b, respectively. The receiving devices 112-4 to 112-6 receive optical signals from the cores 212-4, 214-4, and 216-4 of the MCF 210-4, respectively. In the transceiving nodes 110a and 110b, a fan-in device or a fan-out device is used for adding optical signals to the MCF 200 and dropping optical signals from the MCF 200.

A connector 160-i is provided in each Add/Drop node 120-i (i=1, 2, 3). The connector 160-i is connected to the MCF 210-i and the MCF 210-(i+1). The connector 160-i drops optical signals addressed to the subject node among the optical signals added in the transceiving nodes 110a and 110b from the MCF 210-i and the MCF 210-(i+1). The connector 160-i adds an optical signal addressed to the transceiving node 110a to the cores of the MCF 210-i. The connector 160-i adds an optical signal addressed to the transceiving node 110b to the cores of the MCF 210-(i+1).

In the Add/Drop node 120-1, the connector 160-1 drops an optical signal addressed to the subject node from the core 211-1 of the MCF 210-1. The connector 160-1 connects the dropped optical signal to the transceiving device 125-1. Moreover, the connector 160-1 adds an optical signal generated by the transceiving device 125-1 to the core 212-1 of the MCF 210-1. The optical signal added to the core 212-1 is an optical signal that is transmitted from the subject node to the transceiving node 110a.

Furthermore, the connector 160-1 drops an optical signal addressed to the subject node from the core 211-2 of the MCF 210-2. The connector 160-1 connects the dropped optical signal to the transceiving device 126-1. Moreover, the connector 160-1 adds an optical signal generated by the transceiving device 126-1 to the core 212-2 of the MCF 210-2. The optical signal added to the core 212-2 is an optical signal that is transmitted from the subject node to the transceiving node 110b.

The connector 160-1 connects the cores 213-1 to 216-1 among the cores of the MCF 210-1 to the cores 213-2 to 216-2 among the cores of the MCF 210-2, respectively. The connector 160-1 relays optical signals between the MCF 210-1 and the MCF 210-2. The connector 160-1 relays optical signals transmitted through cores other than the cores 211-1, 212-1, 211-2, and 212-2 through which optical signals are added or dropped.

In the Add/Drop node 120-2, the connector 160-2 drops an optical signal addressed to the subject node from the core 213-2 of the MCF 210-2. The connector 160-2 connects the dropped optical signal to the transceiving device 125-2. Moreover, the connector 160-2 adds an optical signal generated by the transceiving device 125-2 to the core 214-2 of the MCF 210-2. The optical signal added to the core 214-2 is an optical signal that is transmitted from the subject node to the transceiving node 110a.

Furthermore, the connector 160-2 drops an optical signal addressed to the subject node from the core 213-3 of the MCF 210-3. The connector 160-2 connects the dropped optical signal to the transceiving device 126-2. Moreover, the connector 160-2 adds an optical signal generated by the transceiving device 126-2 to the core 214-3 of the MCF 210-3. The optical signal added to the core 214-3 is an optical signal that is transmitted from the subject node to the transceiving node 110b.

The connector 160-2 connects the cores 211-2, 212-2, 215-2, and 216-2 among the cores of the MCF 210-2 to the cores 211-3, 212-3, 215-3, and 216-3 among the cores of the MCF 210-3, respectively. The connector 160-2 relays optical signals between the MCF 210-2 and the MCF 210-3. The connector 160-2 relays optical signals transmitted through cores other than the cores 213-2, 214-2, 213-3, and 214-3 through which optical signals are added or dropped.

In the Add/Drop node 120-3, the connector 160-3 drops an optical signal addressed to the subject node from the core 215-3 of the MCF 210-3. The connector 160-3 connects the dropped optical signal to the transceiving device 126-3. Moreover, the connector 160-3 adds an optical signal generated by the transceiving device 126-3 to the core 216-3 of the MCF 210-3. The optical signal added to the core 216-3 is an optical signal that is transmitted from the subject node to the transceiving node 110a.

Furthermore, the connector 160-3 drops an optical signal addressed to the subject node from the core 215-4 of the MCF 210-4. The connector 160-4 connects the dropped optical signal to the transceiving device 125-3. Moreover, the connector 160-3 adds an optical signal generated by the transceiving device 125-3 to the core 216-3 of the MCF 210-4. The optical signal added to the core 216-4 is an optical signal that is transmitted from the subject node to the transceiving node 110b.

The connector 160-3 connects the cores 211-3 to 214-3 among the cores of the MCF 210-3 to the cores 211-4 to 214-4 among the cores of the MCF 210-4, respectively. The connector 160-3 relays optical signals between the MCF 210-3 and the MCF 210-4. The connector 160-3 relays optical signals transmitted through cores other than the cores 215-3, 216-3, 215-4, and 216-4 through which optical signals are added or dropped.

The connectors 160-1 to 160-3 of the communication system 100A can be configured similarly to the connectors 150-1 to 150-3 of the communication system 100 by using the small-diameter fiber, the optical waveguide, the optical system, and the like as shown in FIGS. 2A, 2B, 3A, 3D, 4A, and 4B.

In the communication system 100A, a transmission communication path and a reception communication path are formed between the transceiving nodes 110a and 110b and the Add/Drop nodes 120-1 to 120-3. The transceiving nodes 110a and 110b can communicate with the Add/Drop nodes 120-1 to 120-3 individually. In this manner, the communication system 100A has a tree-type logical topology in which the transceiving nodes 110a and 110b are used as root nodes.

The Add/Drop nodes 120-1 to 120-3 may use any one of the communication paths between the two transceiving nodes 110a and 110b as an active system (0-system) and use the other as a standby system (1-system). Moreover, the Add/Drop nodes 120-1 to 120-3 may use a communication path of the shorter transmission distance as the 0-system and use a communication path of the longer transmission distance as the 1-system. In the Add/Drop nodes 120-1 to 120-3, since a process of dividing multiplexed optical signals having different wavelengths in respective wavelengths is not required in adding or dropping optical signals, it is possible to reduce the time and labor for installation and maintenance of devices.

Although a case in which each MCF 210 has six cores 211 to 216 has been described, the MCF 210 may have seven or more cores. When the MCF 210 has seven or more cores, optical signals may be added and dropped for two or more cores of the Add/Drop node 120.

Moreover, WDM transmission may be performed in each core of the MCF 210. When WDM transmission is performed, as shown in FIG. 5, a splitter or a combiner for optical signals to be added or dropped is provided in each Add/Drop node 120.

Moreover, the transceiving node 110a and the transceiving node 110b may be connected together using the MCF 210 or an MCF having seven or more cores. In the communication system 100A, when the roles of the transceiving nodes 110a and 110b and the Add/Drop nodes 120-1 to 120-3 are changed, a logical topology can be easily changed by attaching a connector to the transceiving nodes 110a and 110b and replacing the connector 150 of each of the Add/Drop nodes 120-1 to 120-3 with another connector. In this way, it is possible to flexibly cope with a change in the network configuration.

Figure 7:
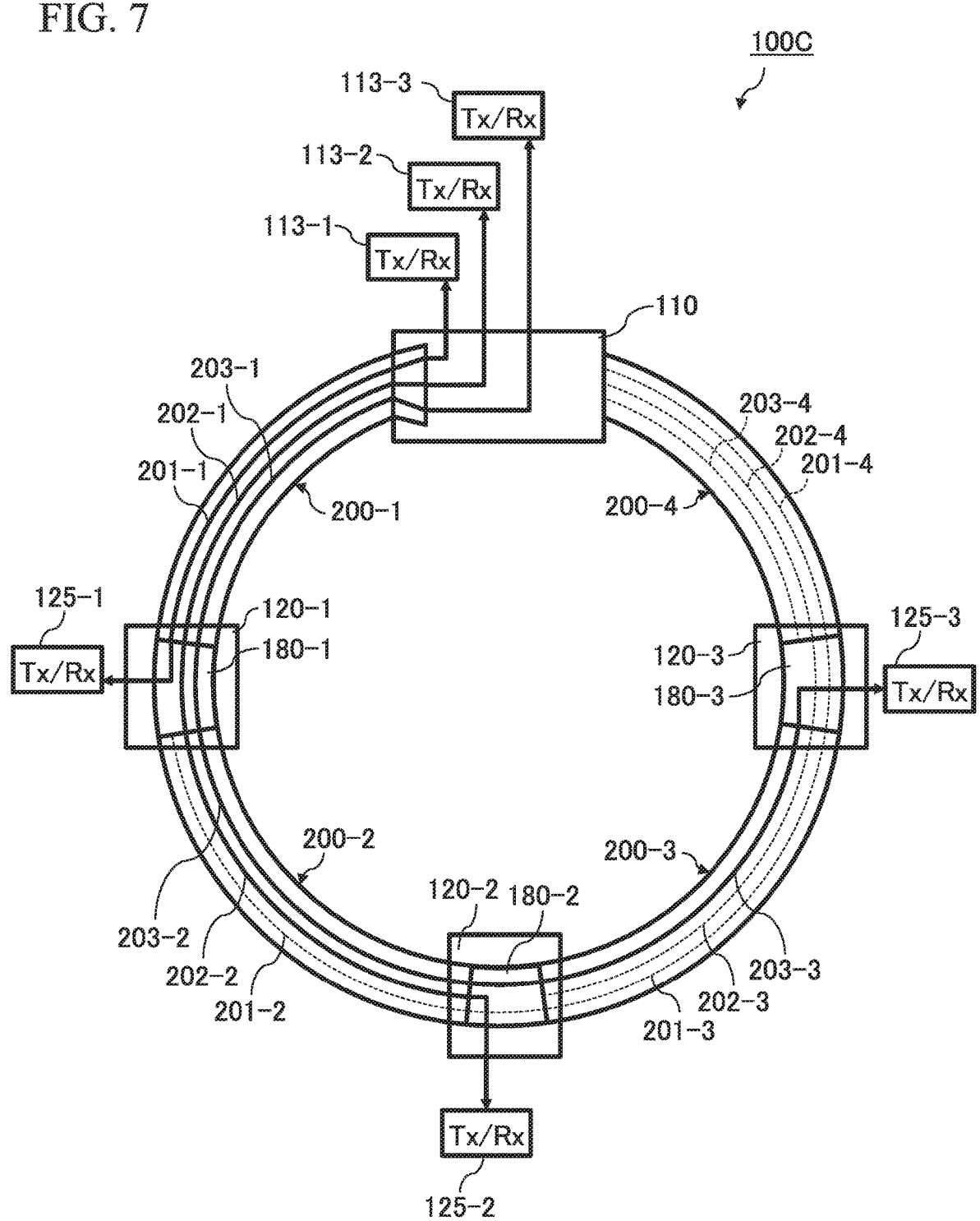
FIG. 7 is a diagram showing a third configuration example of a communication system to which an embodiment of the present invention can be applied.

FIG. 7 is a diagram showing a configuration example of a communication system 100C to which an embodiment of the present invention can be applied. The communication system 100C includes a transceiving node 110 and n Add/Drop nodes 120. FIG. 7 shows a configuration example of the communication system 100C when n=3. In the communication system 100C, the connection of MCFs 200-1 to 200-4 between nodes is similar to the connection in the communication system 100. In the communication system 100C, one core is used for communication from the transceiving node 110 to the respective Add/Drop node 120 and communication from the respective Add/Drop nodes 120 to the transceiving node 110. When one core is used for transmitting optical signals of which the transmission directions are different, the strength of optical signals may be suppressed to a certain level or lower in order to suppress the influence of different optical signals of which the transmission directions are different and the wavelengths of optical signals may be different in respective transmission directions. The communication system 100C is different from the communication system 100 of the first embodiment in that the communication system 100C has a physical topology of a single-system two-way ring configuration.

Each node of the communication system 100C includes a transceiving device (Tx/Rx) that performs communication between nodes. Transceiving devices 113-1 to 113-3 are provided in the transceiving node 110. Transceiving devices 125-1 to 125-3 are provided in the Add/Drop nodes 120-1 to 120-3, respectively. The transceiving devices 113-1 to 113-3 generate optical signals to be transmitted to the Add/Drop nodes 120-1 to 120-3, respectively. Moreover, the transceiving devices 113-1 to 113-3 receive optical signals transmitted from the Add/Drop nodes 120-1 to 120-3, respectively, and acquire information included in the optical signals. The transceiving devices 125-1 to 125-3 generate optical signals to be transmitted to the transceiving node 110. Moreover, the transceiving devices 125-1 to 125-3 receive optical signals transmitted from the transceiving node 110 and acquire information included in the optical signals.

The transceiving devices 113-1 to 113-3 generate optical signals to be transmitted to the Add/Drop nodes 120-1 to 120-3, respectively. Three optical signals generated by the transceiving devices 113-1 to 113-3 are added to the cores 201-1 to 203-1 of the MCF 200-1, respectively. Moreover, the transceiving devices 113-1 to 113-3 receive optical signals from the Add/Drop nodes 120-1 to 120-3 via the cores 201-1 to 203-1 of the MCF 200-1, respectively. A fan-in device or a fan-out device is used for adding optical signals to the MCF 200-1 and dropping optical signals from the MCF 200-1.

A connector 180-$i$ is provided in each Add/Drop node 120-$i$ ($i$=1, 2, 3). The connector 180-$i$ is connected to the MCF 200-$i$ and the MCF 200-($i$+1). The connector 180-$i$ drops an optical signal from the core 201-$i$ of the MCF 200-$i$ and connects the dropped optical signal to the transceiving device 125-$i$. Moreover, the connector 180-$i$ adds an optical signal generated by the transceiving device 125-$i$ to the core 201-$i$ of the MCF 200-$i$. The optical signal generated by the transceiving device 125-$i$ is an optical signal transmitted from the Add/Drop node 120-$i$ to the transceiving node 110. The connector 180-$i$ connects together the cores 201-$i$ and 201-($i$+1) other than the Add/Drop target cores among the cores of the MCF 200-$i$ and the cores of the MCF 200-($i$+1) to relay optical signals.

The transceiving node 110 and the Add/Drop node 120-1 perform two-way communication using a communication path formed by the core 201-1. The transceiving node 110 and the Add/Drop node 120-2 perform two-way communication using a communication path formed by the cores 202-1 and 202-2. The transceiving node 110 and the Add/Drop node 120-3 perform two-way communication using a communication path formed by the cores 203-1, 203-2, and 203-3. The core 201-2 of the MCF 200-2, the cores 201-3 and 202-3 of the MCF 200-3, and the cores 201-4 to 203-4 of the MCF 200-4 are cores which are not used in communication.

In the communication system 100C, the Add/Drop node 120-3 may perform communication with the transceiving node 110 using the core 201-4 of the MCF 200-4 to shorten a communication path. In this case, a fan-in device and a fan-out device are necessary in a connecting portion with the MCF 200-4 in the transceiving node 110.

Figure 8:
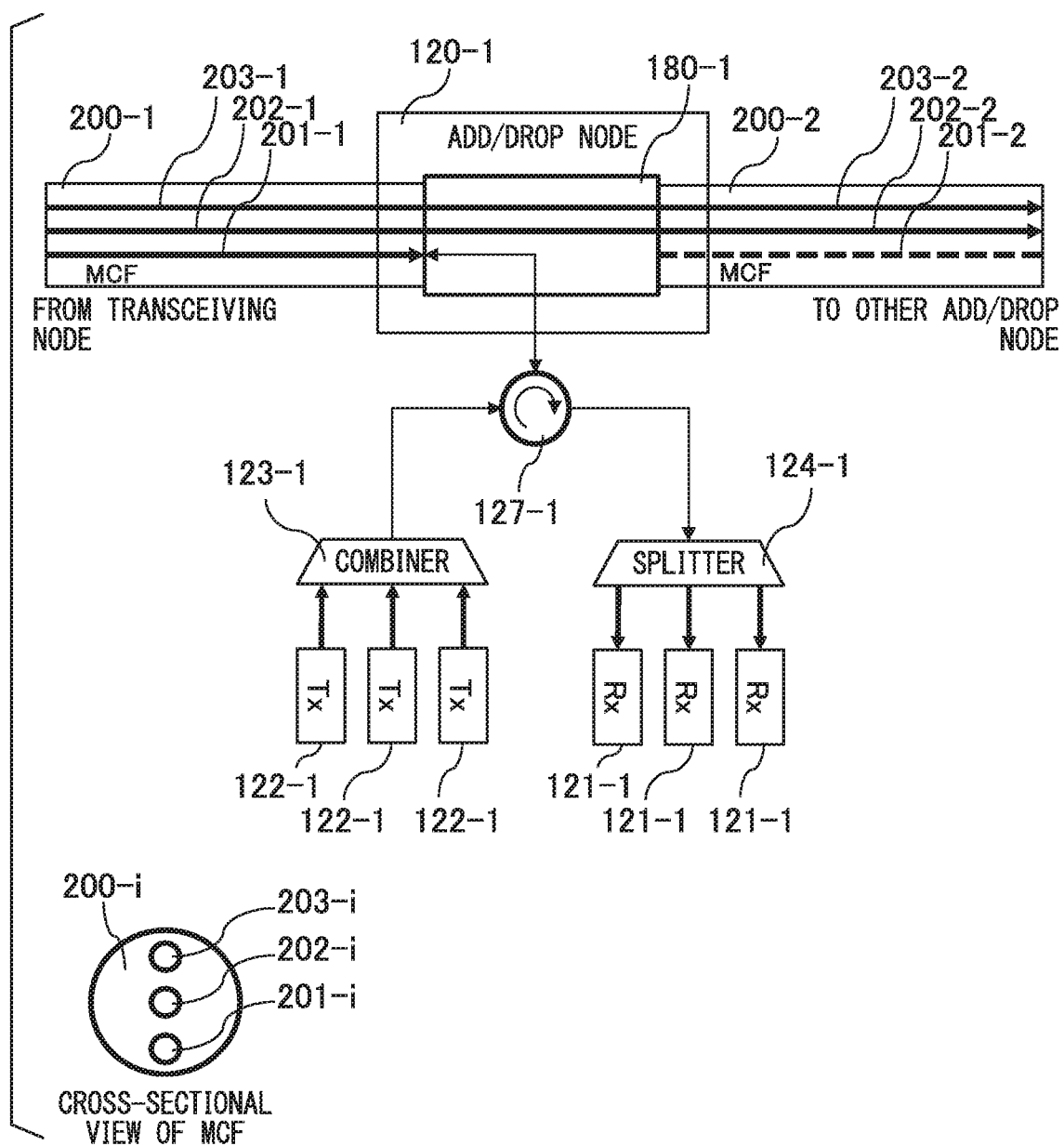
FIG. 8 is a diagram showing a second configuration example of an Add/Drop node when WDM transmission is performed in a communication system.

Moreover, in the communication system 100C, WDM transmission may be performed between the transceiving node 110 and each of the Add/Drop nodes 120-1 to 120-3. When WDM Transmission is performed as shown in FIG. 5 in the first embodiment, it is necessary to split an optical signal dropped from the core in each of the Add/Drop nodes 120-1 to 120-3 into optical signals of respective wavelengths and combine the optical signals of the respective wavelengths to one optical signal. FIG. 8 is a diagram showing a configuration example of the Add/Drop node 120-1 when the communication system 100C performs WDM transmission. The Add/Drop node 120-1 includes a connector 180-1, an optical circulator 127-1, a splitter 124-1, a combiner 123-1, and a plurality of receiving devices 122-1 and a plurality of transmitting devices 121-1 as the transceiving device 125-1.

An optical signal dropped from the core 201-1 of the MCF 200-1 in the connector 180-1 is connected to the optical circulator 127-1. The optical signal connected from the connector 180-1 to the optical circulator 127-1 is output to the splitter 124-1. The splitter 124-1 splits the input optical signal in respective wavelengths and outputs the optical signals obtained by splitting to the receiving device 122-1. Optical signals having different wavelengths generated by the plurality of transmitting devices 121-1 are input to the combiner 123-1. The combiner 123-1 combines the input optical signals and outputs the optical signal obtained by combining to the optical circulator 127-1. The optical signal input from the combiner 123-1 to the optical circulator 127-1 is output to the connector 180-1. The connector 180-1 adds the optical signal from the optical circulator 127-1 to the core 201-1 of the MCF 200-1 whereby an optical signal addressed to the transceiving node 110 is added to the MCF 200-1.

Even when WDM transmission is performed, the optical signals of the cores 202-1 and 203-1 of the MCF 200-1, which are not the Add/Drop target, are relayed to the cores 202-2 and 203-2 of the MCF 200-2. The other Add/Drop nodes 120 have a configuration similar to that of the Add/Drop node 120-1.

In the communication system 100C, although a case in which one core is the Add/Drop target in the respective Add/Drop nodes 120 has been described, optical signals may be dropped from a plurality of cores in the respective Add/Drop nodes 120 and optical signals may be added to a plurality of cores.

Figure 9:
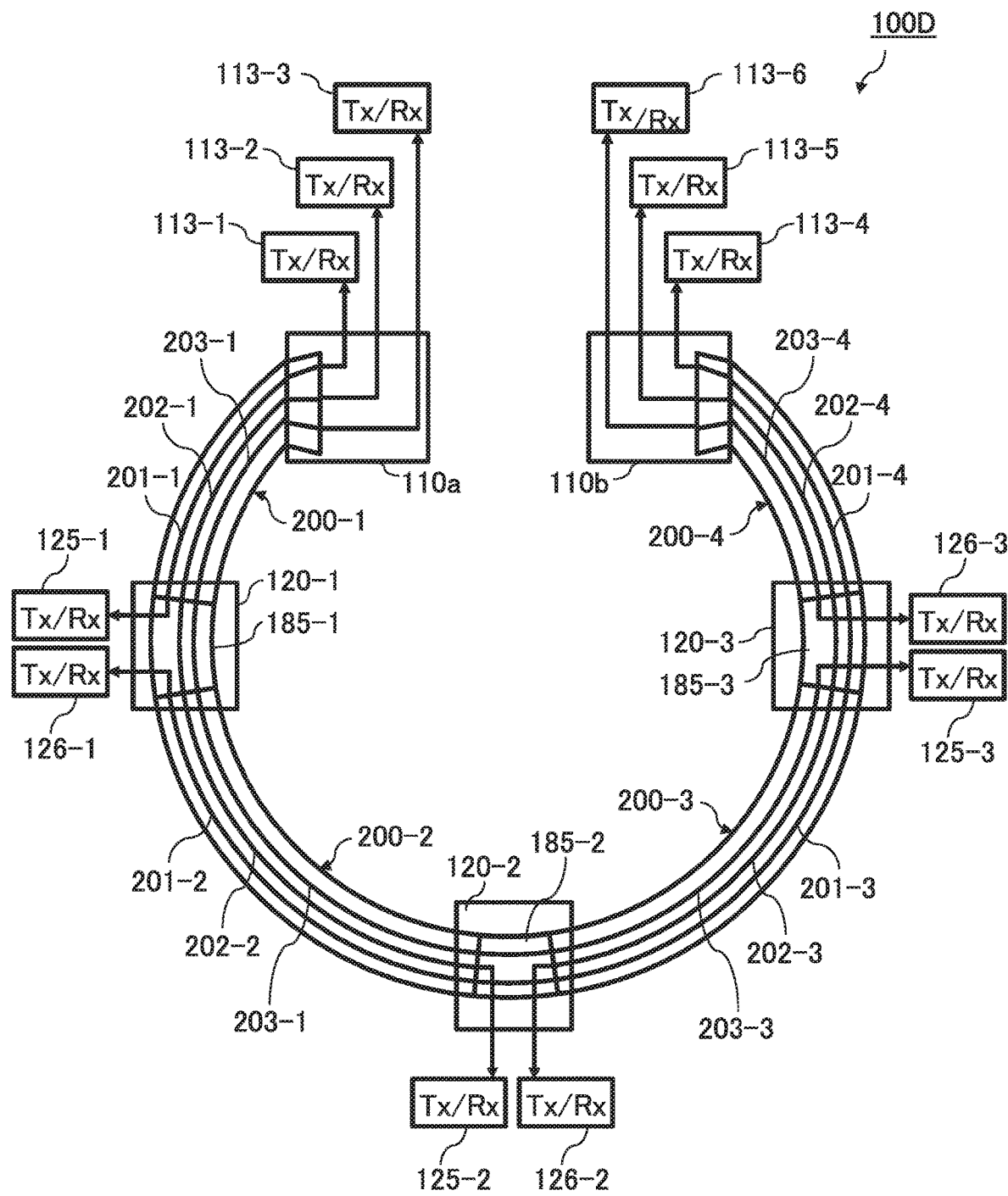
FIG. 9 is a diagram showing a fourth configuration example of a communication system to which an embodiment of the present invention can be applied.

FIG. 9 is a diagram showing a configuration example of a communication system 100D to which an embodiment of the present invention can be applied. The communication system 100D includes transceiving nodes 110a and 110b and n Add/Drop nodes 120. FIG. 9 shows a configuration example of the communication system 100D when n=3. In the communication system 100D, the connection of the MCFs 200-1 to 200-4 between nodes is similar to the connection of the MCFs 210-1 to 210-4 of the communication system 100A. In the communication system 100D, one core is used for communication from the transceiving nodes 110a and 110b to the respective Add/Drop nodes 120 and communication from the Add/Drop nodes 120 to the transceiving nodes 110a and 110b. The communication system 100D has a physical topology of a dual-system two-way ring configuration.

Each node of the communication system 100D includes a transceiving device (Tx/Rx) that performs communication between nodes. Transceiving devices 113-1 to 113-3 are provided in the transceiving node 110a. Transceiving devices 113-4 to 113-6 are provided in the transceiving node 110b. Transceiving devices 125-1 to 125-3 and 126-1 to 126-3 are provided in the Add/Drop nodes 120-1 to 120-3, respectively. The transceiving devices 113-1 to 113-6 generate optical signals to be transmitted to the Add/Drop nodes 120-1 to 120-3, respectively. The transceiving devices 125-1 to 125-3 generate optical signals to be transmitted to the transceiving node 110a. The transceiving devices 126-1 to 126-3 generate optical signals to be transmitted to the transceiving node 110b. Moreover, the transceiving devices 113-1 to 113-6 receive optical signals transmitted from the Add/Drop nodes 120-1 to 120-3, respectively, and acquire information included in the optical signals. The transceiving devices 125-1 to 125-3 receive optical signals transmitted from the transceiving node 110a and acquire information included in the optical signals. The transceiving devices 126-1 to 126-3 receive optical signals transmitted from the transceiving node 110b and acquire information included in the optical signals.

In the transceiving node 110a, the transceiving devices 113-1 to 113-3 generate optical signals to be transmitted to the Add/Drop nodes 120-1 to 120-3, respectively. Three optical signals generated by the transceiving devices 113-1 to 113-3 are added to the cores 201-1 to 203-1 of the MCF 200-1, respectively. Moreover, the transceiving devices 113-1 to 113-3 receive optical signals from the Add/Drop nodes 120-1 to 120-3 via the cores 201-1 to 203-1 of the MCF 200-1, respectively. A fan-in device or a fan-out device is used for adding optical signals to the MCF 200-1 and dropping optical signals from the MCF 200-1.

In the transceiving node 110b, the transceiving devices 113-4 to 113-6 generate optical signals to be transmitted to the Add/Drop nodes 120-1 to 120-3, respectively. Three optical signals generated by the transceiving devices 113-4 to 113-6 are added to the cores 201-4 to 203-4 of the MCF 200-4, respectively. Moreover, the transceiving devices 113-4 to 113-6 receive optical signals from the Add/Drop nodes 120-1 to 120-3 via the cores 201-4 to 203-4 of the MCF 200-4, respectively. A fan-in device or a fan-out device is used for adding optical signals to the MCF 200-4 and dropping optical signals from the MCF 200-4 similarly to the transceiving node 110a.

A connector 185-$i$ is provided in each Add/Drop node 120-$i$ ($i$=1, 2, 3). The connector 185-$i$ is connected to the MCF 200-$i$ and the MCF 200-($i$+1). The connector 185-$i$ drops an optical signal from the core 20$i$-$i$ of the MCF 200-$i$ and connects to the dropped optical signal to the transceiving device 125-$i$. The connector 185-$i$ adds an optical signal generated by the transceiving device 125-$i$ to the core 20$i$-$i$ of the MCF 200-$i$. The optical signal generated by the transceiving device 125-$i$ is an optical signal that is transmitted from the Add/Drop node 120-$i$ to the transceiving node 110a.

Moreover, the connector 185-$i$ drops an optical signal from the core 20$i$-($i$+1) of the MCF 200-($i$+1) and connects the dropped optical signal to the transceiving device 126-$i$. The connector 185-$i$ adds an optical signal generated by the transceiving device 126-$i$ to the core 20$i$-($i$+1) of the MCF 200-($i$+1). The optical signal generated by the transceiving device 126-$i$ is an optical signal that is inserted from the Add/Drop node 120-$i$ to the transceiving node 110b.

Moreover, the connector 185-$i$ connects together the core 20$i$-$i$ and the core 20$i$-($i$+1) other than the cores which are the Add/Drop target among the cores of the MCF 200-$i$ and the cores of the MCF 200-($i$+1) to relay optical signals.

The transceiving node 110a and the Add/Drop node 120-1 perform two-way communication using a communication path formed by the core 201-1. The transceiving node 110a and the Add/Drop node 120-2 perform two-way communication using a communication path formed by the cores 202-1 and 202-2. The transceiving node 110a and the Add/Drop node 120-3 perform two-way communication using a communication path formed by the cores 203-1, 203-2, and 203-3.

The transceiving node 110b and the Add/Drop node 120-1 perform two-way communication using a communication path formed by the cores 201-4, 201-3, and 201-2. The transceiving node 110b and the Add/Drop node 120-2 perform two-way communication using a communication path formed by the cores 202-4 and 202-3. The transceiving node 110*b* and the Add/Drop node 120-3 perform two-way communication using a communication path formed by the core 203-4.

In this manner, the communication system 100D has a tree-type logical topology in which the transceiving nodes 110*a* and 110*b* are used as root nodes and can communicate with each of the Add/Drop nodes 120-1 to 120-3. In the communication system 100D, the Add/Drop nodes 120-1 to 120-3 each can communicate with the transceiving nodes 110*a* and 110*b*. The Add/Drop nodes 120-1 to 120-3 may use any one of the communication paths between the two transceiving nodes 110*a* and 110*b* as an active system (0-system) and use the other as a standby system (1-system). Moreover, the Add/Drop nodes 120-1 to 120-3 may use a communication path of the shorter transmission path as the 0-system and use a communication path of the longer transmission path as the 1-system.

In the communication system 100D, the transceiving node 110*a* and the transceiving node 110*b* may be connected together using the MCF 200 or an MCF having four or more cores. In the communication system 100D, when the roles of the transceiving nodes 110*a* and 110*b* and the Add/Drop nodes 120-1 to 120-3 are changed, a logical topology can be easily changed by attaching a connector to the transceiving nodes 110*a* and 110*b* and replacing the connector 185 of the respective Add/Drop nodes 120-1 to 120-3 with another connector. In this way, it is possible to flexibly cope with a change in the network configuration.

Four communication systems 100, 100A, 100C, and 100D have been described as an a communication system to which an embodiment of the present invention can be applied. In the respective communication systems, a configuration in which MCF is used in one or a plurality of connections between nodes has been described. However, a transmission quality estimation device and a transmission quality estimation method described in the respective embodiments may be applied to a communication system in which one or a plurality of single core fibers (SCFs) is used for connection between nodes. When a SCF is used for connection between nodes, a conversion connector that connects an MCF and a plurality of SCFs or a conversion connector that connects a connector and a plurality of SCFs is used.

Figure 10:
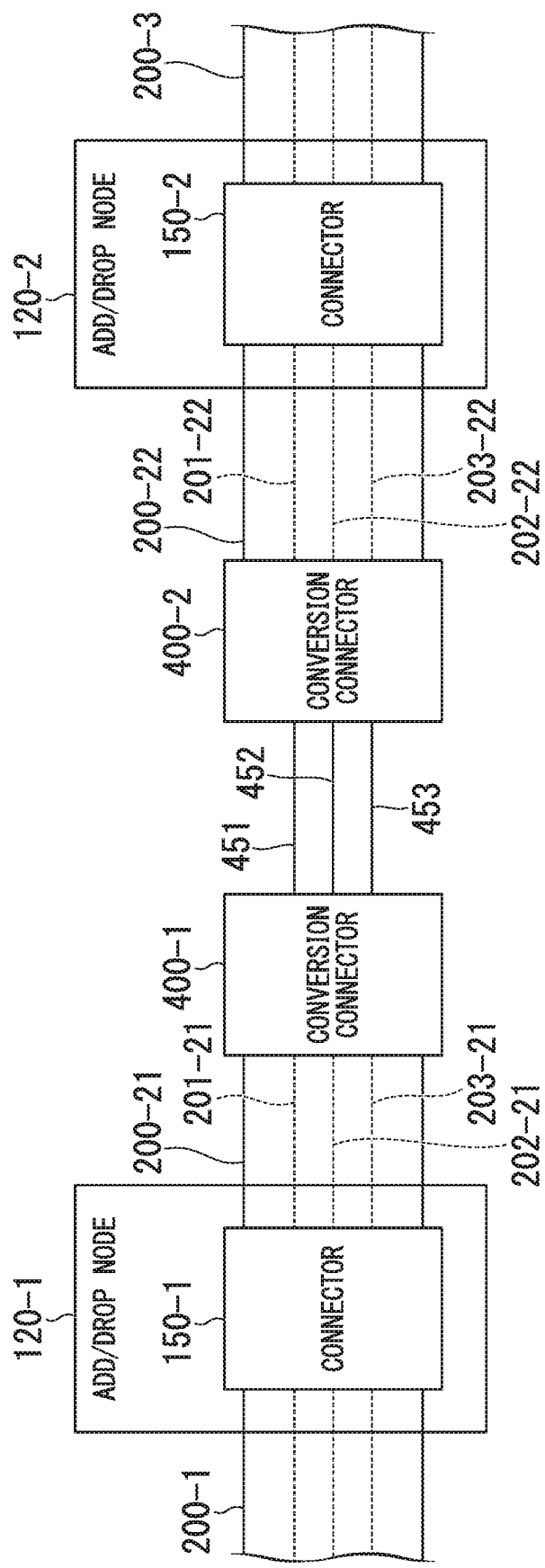
FIG. 10 is a diagram showing a first configuration example of the communication system shown in FIG. 1, in which a plurality of SCFs is used in a partial segment of the connection between Add/Drop nodes.

FIG. 10 is a block diagram showing a first configuration example in which a plurality of SCFs 451, 452, and 453 are used in a partial segment of the connection between the Add/Drop node 120-1 and the Add/Drop node 120-2 in the communication system 100 shown in FIG. 1. The SCFs 451, 452, and 453 are used between the MCF 200-21 connected to the connector 150-1 and the MCF 200-22 connected to the connector 150-2.

A conversion connector 400-1 is used for connection between the MCF 200-21 and the SCFs 451 to 453. The conversion connector 400-1 connects the cores 201-21, 202-21, and 203-21 of the MCF 200-21 and the SCFs 451, 452, and 453, respectively. A conversion connector 400-2 is used for connection between the MCF 200-22 and the SCFs 451 to 453. The conversion connector 400-2 connects the cores 201-22, 202-22, and 203-22 of the MCF 200-22 and the SCFs 451, 452, and 453, respectively.

The conversion connectors 400-1 and 400-2 have a configuration similar to that of a fan-in device or a fan-out device. By using the conversion connectors 400-1 and 400-2, it is possible to use the SCF in a partial segment of the connection between nodes.

Figure 11:
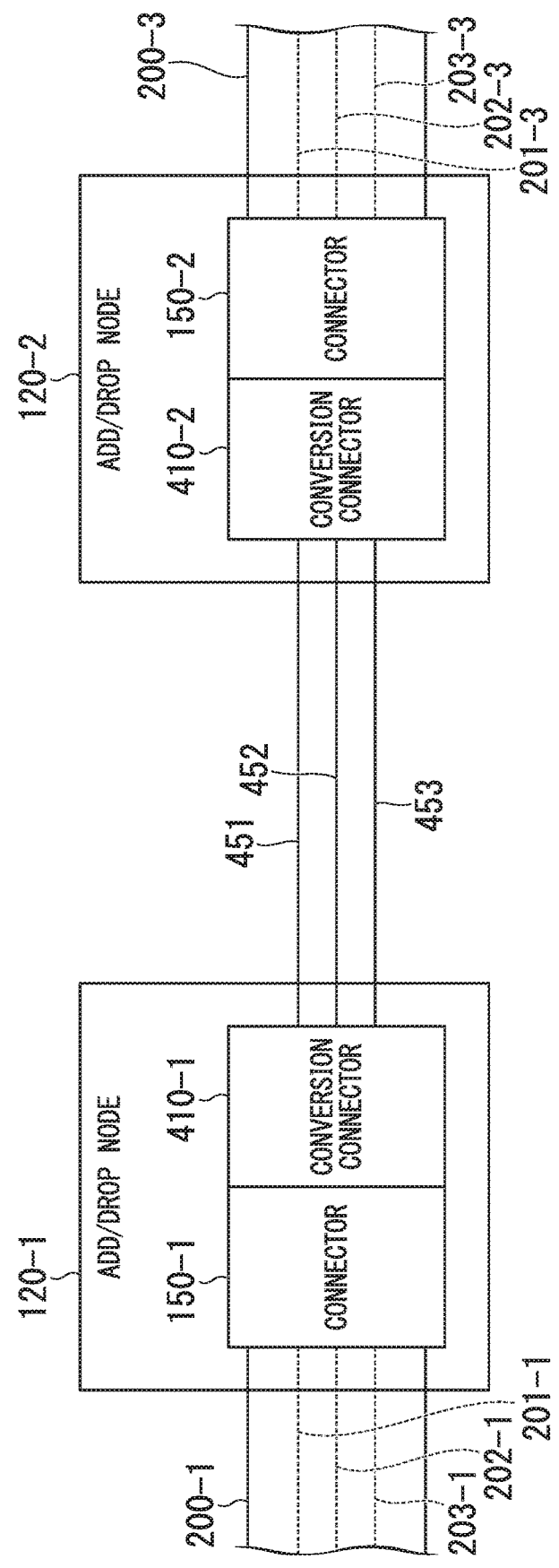
FIG. 11 is a diagram showing a second configuration example of the communication system shown in FIG. 1, in which a plurality of SCFs is used in the connection between Add/Drop nodes.

FIG. 11 is a block diagram showing a second configuration example of the communication system 100 shown in FIG. 1 in which a plurality of SCFs 451, 452, and 453 are used in the connection between the Add/Drop node 120-1 and the Add/Drop node 120-2. The SCFs 451, 452, and 453 are used for the connection between the connector 150-1 and the connector 150-2. The configuration example shown in FIG. 11 is different from the configuration example shown in FIG. 10 in that an MCF is not used for the connection between the Add/Drop nodes 120-1 and 120-2.

The Add/Drop node 120-1 further includes a conversion connector 410-1. The conversion connector 410-1 is attached to a side of the connector 150-1 close to the Add/Dropnode 120-2. The Add/Drop node 120-2 further includes a conversion connector 410-2. The conversion connector 410-2 is attached to a side of the connector 150-2 close to the Add/Drop node 120-1. The SCFs 451 to 453 of the same number as the number of cores of the MCF 200 are used for the connection between the conversion connectors 410-1 and 410-2.

The conversion connector 410-1 connects together the SCFs 451, 452, and 453 and the connector 150-1. The connector 150-1 performs input/output of optical signals to/from the conversion connector 410-1 instead of the MCF 200-2. The connector 150-1 connects together the cores 202-1 and 203-1 of the MCF 200-1 and the SCFs 452 and 453, respectively, via the conversion connector 410-1. The conversion connector 410-1 adds an optical signal generated by the transmitting device 121-1 to the SCF 451 via the connector 150-1.

The conversion connector 410-2 connects together the SCFs 451, 452, and 453 and the connector 150-2. The connector 150-2 performs input/output of optical signals to/from the conversion connector 410-2 instead of the MCF 200-2. The connector 150-2 connects together the SCF 451 and 453 and the cores 201-3 and 203-3 of the MCF 200-3, respectively, via the conversion connector 410-2. The connector 150-2 connects an optical signal dropped from the SCF 453 to the receiving device 122-2 via the conversion connector 410-2.

The conversion connectors 410-1 and 410-2 has a configuration similar to that of a fan-in device or a fan-out device. By using the conversion connectors 410-1 and 410-2, it is possible to use the SCF for the connection between nodes.

FIGS. 10 and 11 show a configuration example in which nodes are connected using the SCF instead of the MCF 200 having three cores. A SFC may be used for the connection between nodes instead of the MCF having two cores or four or more cores. In this case, similarly, a conversion connector is used.

FIGS. 10 and 11 show an example in which a SCF is used for the connection between the Add/Drop nodes 120-1 and 120-2 of the communication system 100 shown in FIG. 1. The SCF may be used for the connection between other nodes. In this case, the conversion connector 400 may be used for the connection between one set of nodes and the conversion connector 410 may be used for the connection between the other set of nodes. Moreover, a combination of the conversion connector 400 that connects an MCF and a SCF and the conversion connector 410 connected to the connector 150 may be used for the connection between one set of nodes. For example, the conversion connector 400 may be used in the Add/Drop node 120-1, and the conversion connector 410 may be used in the Add/Drop node 120-2.

MCF and SCF may be switched a plurality of times for the connection between one set of nodes. For example, MCF and SCF may be used for the connection between the Add/Drop nodes 120-1 and 120-2 in the order of MCF, SCF, MCF, SCF, and MCF. In this case, a conversion connector is used for each between the MCF and the SCF.

The connector 150-1 and the conversion connector 410-1 described in FIG. 11 may be configured as one connector. Similarly, the connector 150-2 and the conversion connector 410-2 may be configured as one connector. That is, a connector connected to the MCF and the plurality of SCFs may add or drop optical signals to or from the MCF or the SCF and may relay optical signals between the MCF and the SCF.

As described above, the SCF may be used in one or a plurality of connections between the nodes in the communication system 100 shown in FIG. 1 and the other communication systems.

Hereinafter, respective embodiments of the present invention will be described.

First Embodiment

In a first embodiment, an optical signal of a specific core among a plurality of cores of a multi-core fiber (MCF) is monitored by all Add/Drop nodes to estimate transmission quality between the specific core and adjacent cores.

Figure 12:
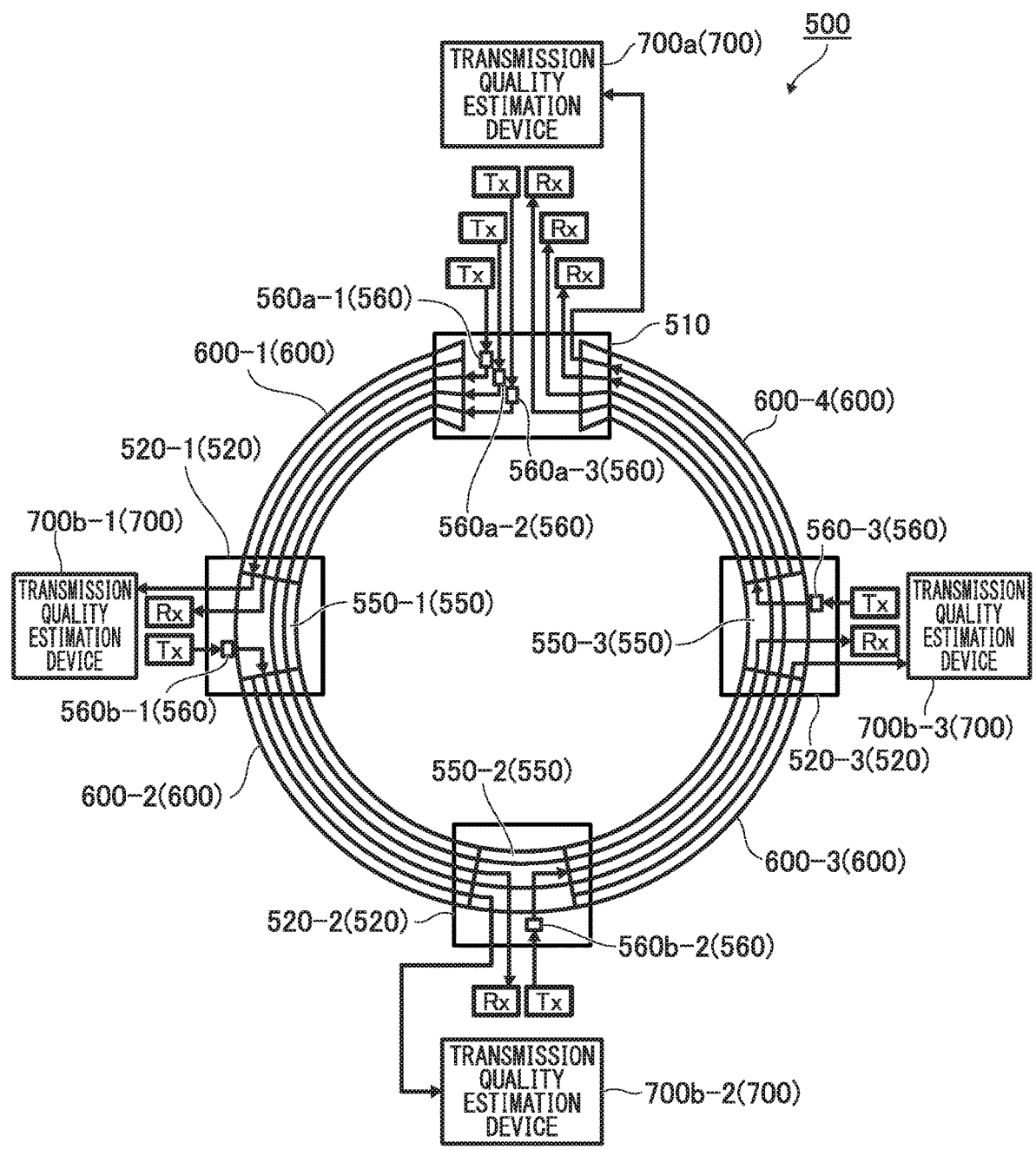
FIG. 12 is a diagram showing a configuration example of a transmission quality estimation system according to a first embodiment of the present invention.

FIG. 12 is a diagram showing a configuration example of a transmission quality estimation system 500 according to the first embodiment. The transmission quality estimation system 500 includes a transceiving node 510, n (n is an integer of 1 or more) Add/Drop nodes 520, and n+1 transmission quality estimation devices 700. The diagram shows an example of n=3. In the following description, the transceiving node 510 and the Add/Drop node 520 will be collectively referred to as a "node," and n Add/Drop nodes 520 will be referred to as Add/Drop nodes 520-1 to 520-$n$. Moreover, the transmission quality estimation device 700 connected to the transceiving node 510 will be referred to as a transmission quality estimation device 700$a$. The transmission quality estimation device 700 connected to the Add/Drop node 520-$i$ (i is an integer of 1 or more and n or less) will be referred to as a transmission quality estimation device 700$b$-$i$. The transmission quality estimation devices 700$b$-1 to 700$b$-$n$ will be collectively referred to as a transmission quality estimation device 700$b$. The transmission quality estimation device 700 may be provided inside each node.

Nodes are connected together by an MCF 600. In the first embodiment, although a case in which the transceiving node 510. The Add/Drop node 520, and the MCF 600 forms the communication system 100 having the single-system one-way ring configuration shown in FIG. 1 will be described as an example, a communication system of another topology may be formed. The transceiving node 510 corresponds to the transceiving node 110 shown in FIG. 1. The Add/Drop nodes 520-1 to 520-$n$ correspond to the Add/Drop nodes 120 to 120-$n$ shown in FIG. 1, respectively. However, the MCF 600 has a core for transmitting transmission quality measurement light in addition to a core for transmitting a communication optical signal. The transmission quality measurement light is light leaking from the core for transmitting a communication optical signal.

Hereinafter, the MCF 600 that connects together the transceiving node 510 and the Add/Drop node 520-1 will be referred to as an MCF 600-1. The MCF 600 the connects together the Add/Drop node 520-$i$ (i=2, . . . , n) and the Add/Drop node 520-($i$-1) will be referred to as an MCF 600-$i$. The MCF 600 that connects together the Add/Drop node 520-$n$ and the transceiving node 510 will be referred to as an MCF 600-($n$+1). A node adjacent in a direction reverse to a transmission direction of an optical signal among adjacent nodes will be referred to as a previous node.

The transceiving node 510 includes a modulator 560. The Add/Drop node 520 includes a connector (a core connection unit) 550 and a modulator 560. The modulator 560 modulates a communication optical signal added to the cores of the MCF 600 so that respective cores that propagate the optical signal can be identified uniquely. For example, the modulator 560 may perform modulation so that communication optical signals can be identified individually. N modulators 560 included in the transceiving node 510 will be referred to as modulators 560$a$-1 to 560$a$-$n$, and the modulators 560$a$ to 560$a$-$n$ will be collectively referred to as a modulator 560$a$. Moreover, the modulator 560 included in the Add/Drop node 520-$i$ will be referred to as a modulator 560$b$-$i$, and the modulators 560$b$-1 to 560$b$-$n$ will be collectively referred to as a modulator 560$b$. The modulator 560 may be provided outside each node. Modulation for identifying optical signals individually may be performed on an electrical signal used for generating an optical signal as well as directly on optical signals generated by a transmitter Tx. That is, modulation for identifying optical signals individually may be performed either before an optical signal is generated from an electrical signal indicating information to be transmitted or after an optical signal is generated from an electrical signal. When modulation for identifying optical signals individually is per formed on an electrical signal an external modulator 560 is not necessary. The connector 550 adds and drops an optical signal to and from a specific core of the MCF 600 and relays optical signals of other cores. The connector 550 included in the Add/Drop node 520-$i$ will be referred to as a connector 550-$i$.

Figure 13:
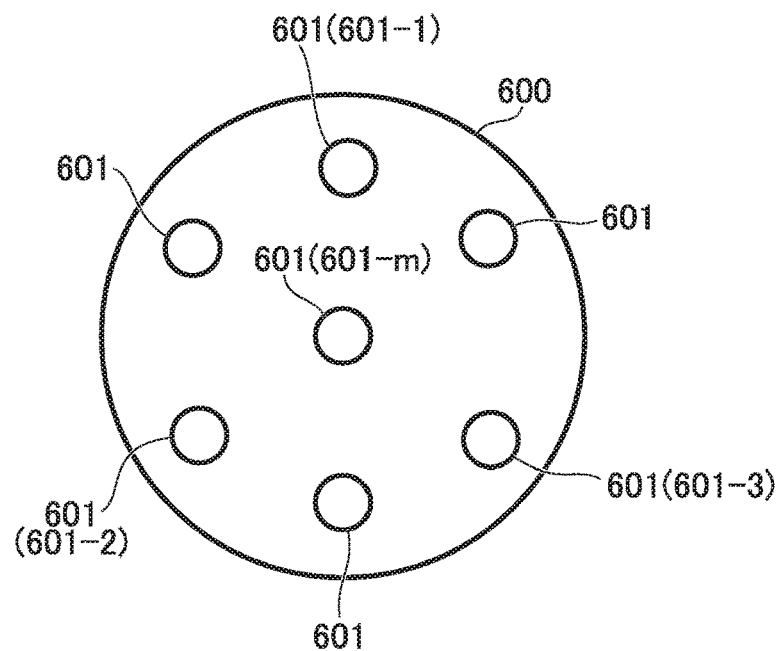
FIG. 13 is a cross-sectional view of a multi-core fiber according to the first embodiment.

FIG. 13 is a cross-sectional view of the MCF 600 according to the first embodiment. As shown in the diagram, the MCF 600 includes m cores 601 (m is an integer of n+1 or more). Some partial cores 601 among them cores 601 transmit a transmission quality measurement optical signal. The other cores 601 transmit a communication optical signal. Hereinafter, the respective m cores 601 will be referred to as cores 601-1 to 601-$m$. For the sake of simplicity, a case in which the core 600-$i$ transmits a communication optical signal added or dropped by the Add/Drop node 520-$i$ (i is an integer of 1 or more and n or less) and the core 601-$m$ transmits a transmission quality measurement optical signal will be described as an example. Although it is preferable that the core 601-$m$ be equidistant from each of the other cores 601-1 to 601-$n$ that transmits communication optical signals, the core 600-$m$ may not be equidistant from each of the other cores 601-1 to 601-$n$.

Optical signals transmitted by the respective cores 601 of the MCF 600 are influenced (crosstalk) from light leaking from other cores 601. Therefore, the transceiving node 510 and the respective Add/Drop nodes 520 drop light leaking from other cores 601-1 to 601-$n$ to the core 601-$m$ of the MCF 600 as transmission quality measurement light. The transmission quality estimation device 700 measures the dropped transmission quality measurement light and estimates transmission quality on the basis of the measurement result.

Figure 14:
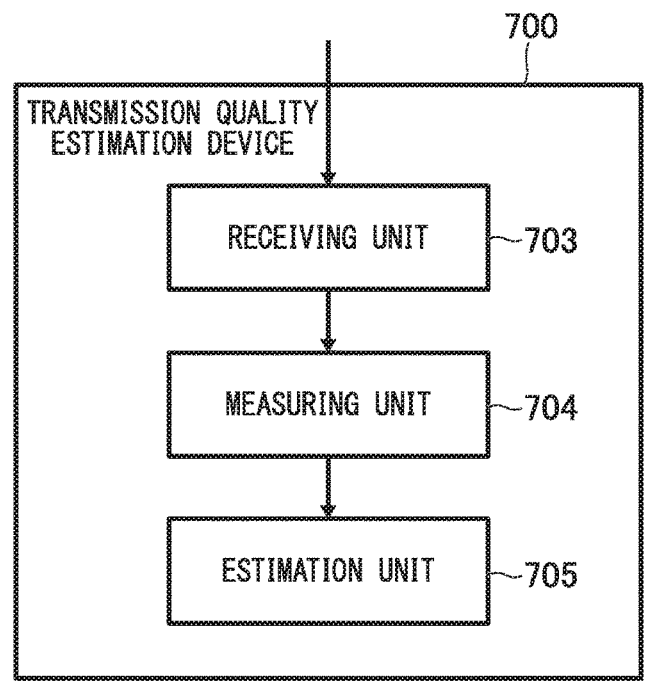
FIG. 14 is a block diagram showing a configuration of the transmission quality estimation device according to the first embodiment.

FIG. 14 is a block diagram showing a configuration of the transmission quality estimation device 700. The transmission quality estimation device 700 includes a receiving unit 703, a measuring unit 704, and an estimation unit 705. The receiving unit 703 receives the transmission quality measurement light dropped by a node. The measuring unit 704 measures the light received by the receiving unit 703. The estimation unit 705 estimates transmission quality of the cores 601-1 to 601-$n$ on the basis of a measurement result obtained by the measuring unit 704. Arbitrary conventional techniques can be used in estimation of transmission quality. A communication wavelength range which is a band used for communication optical signals is used for estimation of transmission quality.

Next, an operation of the transmission quality estimation system 500 will be described.

The transmission quality estimation system 500 transmits a communication optical signal addressed to respective Add/Drop nodes 520 using the cores 601-1 to 601-$n$ of the MCF 600. Specifically, the transceiving node 510 performs low frequency modulation on a communication optical signal addressed to the Add Drop node 520-$i$ ($i$ is an integer of 1 or more and n or less) using the modulator 560$a$-$i$ and adds the optical signal obtained by the low frequency modulation to the core 601-$i$ of the MCF 600-1. For example, when normal power is 1 when an optical signal is ON, the modulator 560$a$ performs low-frequency intensity modulation gently so that the power becomes 1.1, 1.0, and 0.9. In this manner, the modulator 560$a$ changes the absolute value of intensity to an extent that there is no influence on signal quality to perform low frequency modulation. The modulators 560$a$-1 to 560$a$-$n$ change the frequency of the low frequency modulation in accordance with the cores 601-1 to 601-$n$. A modulation period of the intensity modulation by the modulator 560$a$ is sufficiently longer than a modulation period when information to be transmitted by an optical signal is generated. If the modulation period of the intensity modulation is different for respective optical signals, it is possible to identify individual optical signals. Here, the modulation period of intensity modulation is a period in which an influence on demodulation of communication information transmitted by an optical signal is a certain level or lower and is a period in which the communication information can be demodulated even when there is an influence by noise or deterioration of optical signals.

The modulator 560$b$-$i$ of the Add/Drop node 520-$i$ performs low frequency modulation of a frequency corresponding to the core 601-$i$ on a communication optical signal addressed to the transceiving node 510 similarly to the modulator 560$a$. The connector 550-$i$ adds the communication optical signal addressed to the transceiving node 510 obtained by the low frequency modulation of the modulator 560$b$-$i$ to the core 601-$i$ of the MCF 600-($i$+1).

The connector 550-$i$ of each Add/Drop node 520-$i$ drops the communication optical signal addressed to the subject node from the core 601-$i$ of the MCF 600-$i$. Moreover, the connector 550-$i$ relays a communication optical signal transmitted by a core 601-$j$ ($j\neq i$, $j$ is an integer of 1 or more and n or less) of the MCF 600-$i$ to the core 601-$j$ of the MCF 600-($i$+1).

The transmission quality estimation system 500 does not add light to the core 601-$m$ of the MCF 600. However, light leaking from other cores 601-$i$ is transmitted to the core 601-$m$. The connector 550-$i$ of each Add/Drop node 520-$i$ drops transmission quality measurement light from the core 601-$m$ of the MCF 600-$i$ and inputs the transmission quality measurement light to the transmission quality estimation device 700$b$-$i$. Moreover, the transceiving node 510 drops transmission quality measurement light from the core 601-$m$ of the MCF 600-($n$+1) and inputs the transmission quality measurement light to the transmission quality estimation device 700$a$.

The receiving unit 703 of each transmission quality estimation device 700 receives light dropped by the connector 550 or the transceiving node 510. The measuring unit 704 measures the light received by the receiving unit 703. The estimation unit 705 estimates the transmission quality of the respective cores 601-1 to 601-$n$ on the basis of the measurement result obtained by the measuring unit 704.

For example, the measuring unit 704 measures light intensity of individual frequency components of low frequency modulation for the cores 601-1 to 601-$n$ included in the transmission quality measurement light. The estimation unit 705 identifies a core in which light leakage is the largest among the cores 601-1 to 601-$n$ on the basis of the light intensity of the respective low frequency components included in the transmission quality measurement light. That is, the estimation unit 705 estimates the transmission quality of the cores 601-1 to 601-$n$ that have transmitted communication optical signals modulated by the low frequency on the basis of the light intensity of the respective low frequency components included in the transmission quality measurement light. The fact that a low frequency component of a communication optical signal is included in a transmission quality measurement light indicates that light leaks horn the core 601 that is configured to transmit the communication optical signal. The fact that light leaks from the core 601 indicates that the power of an optical signal transmitted through the core 601 is attenuated. Light leakage is likely to occur particularly when the MCF 600 is bent abruptly, for example. The transmission quality estimation device 700 can estimate noise and signal deterioration such as bending loss on the basis of the magnitude of a frequency component of the low frequency modulation measured on the basis of the transmission quality measurement optical signal.

Some of the modulators 560 among the modulators 560 provided in each of the transceiving nodes 510 and the Add/Drop nodes 520 may operate according to the MCF 600 or the core 601 dial is to be measured.

Moreover, some of the functions of the transmission quality estimation devices 700 of the respective nodes may be shared. For example, some of the transmission quality estimation devices 700$a$ and 700$b$-1 to 700$b$-$n$ may include the estimation unit 705. The transmission quality estimation device 700 that does not include the estimation unit 705 transmits a measurement result obtained by the measuring unit 704 to the transmission quality estimation device 700 that includes the estimation unit 705. The estimation unit 705 of the transmission quality estimation device 700 having received the measurement result measures the transmission quality on the basis of the received measurement result.

Although the single-system one-way ring configuration has been described, when the transceiving node 510, the Add/Drop node 520, and the MCF 600 form a dual-system one-way ring configuration, the transmission quality estimation system 500 may further transmit a communication optical signal in a reverse direction to the above-described direction and perform a transmission quality estimation process similar to the above-described process.

In the case of a dual-system one-way ring configuration, the transmission quality estimation system 500 includes two transceiving nodes 510 corresponding to the transceiving nodes 110$a$ and 110$b$ shown in FIG. 6. The transceiving node 510 connected to the MCF 600-1 is a transceiving node 510$a$, and the transceiving node 510 connected to the MCF 600-($n$+1) is a transceiving node 510$b$. Moreover, the Add/Drop nodes 520-1 to 520-$n$ correspond to the Add/Drop nodes 120-1 to 120-$n$ shown in FIG. 6, respectively. The MCF 600 includes m cores 601 (m is an integer of 2n+1 or more). The core 601-$m$ transmits a transmission quality measurement light. The core 601-($2i$−1) ($i$ is an integer of 1 or more and n or less) transmits a communication optical signal addressed to the Add/Drop node 520-$i$. The core 601-2$i$ transmits an optical signal addressed from the Add/Drop node 520-$i$ to the transceiving nodes 510$a$ and 510$b$. The modulator 560 performs low frequency modulation on the communication optical signal using frequencies capable of identifying the respective cores 601-1 to 601-2$n$ that add the optical signal.

The transceiving node 510$a$ performs low frequency modulation on a communication optical signal addressed to the Add/Drop node 520-$i$ using the modulator 560$a$ and adds an optical signal obtained by the low frequency modulation to the core 601-(2$i$–1) of the MCF 600-1. Moreover, the transceiving node 510$b$ performs low frequency modulation on a communication optical signal addressed to the Add/Drop node 520-$i$ using the modulator 560$a$ and adds an optical signal obtained by the low frequency modulation to the core 601-(2$i$–1) of the MCF 600-($n$+1). Moreover, the connector 550-$i$ of each Add/Drop node 520-$i$ adds a communication optical signal addressed to the transceiving node 510$a$, obtained by the low frequency modulation of the modulator 560$b$-$i$ to the core 601-2$i$ of the MCF 600-$i$. The connector 550-$i$ adds a communication optical signal addressed to the transceiving node 510$b$, obtained by the low frequency modulation of the modulator 560$b$-$i$ to the core 601-2$i$ of the MCF 600-($i$+1).

The connector 550-$i$ of each Add/Drop node 520-$i$ drops a communication optical signal addressed to the subject node from the core 601-(2$i$–1) of the MCF 600-$i$ and the core 601-(2$i$–1) of the MCF 600-($i$+1) and drops transmission quality measurement light from the core 601-$m$ of the MCF 600-$i$. Furthermore, the connector 550-$i$ relays a communication optical signal transmitted by the core 601-(2$i$–1) ($j{\neq}i$, $j$ is an integer of 1 or more and n or less) of the MCF 600-$i$ to the core 601-(2$i$–1) of the MCF 600-($i$+1) and relays a communication optical signal transmitted by the core 601-2$j$ of the MCF 600-($i$+1) to the core 601-2$j$ of the MCF 600-$i$.

The transceiving node 510$a$ drops a communication optical signal from the core 601-2$i$ of the MCF 600-1 and drops transmission quality measurement light from the core 601-$m$. Similarly, the transceiving node 510$b$ drops a communication optical signal from the core 601-2$i$ of the MCF 600-($n$+1) and drops transmission quality measurement light from the core 601-$m$.

The operation of the transmission quality estimation device 700 on the transmission quality measurement light dropped in each node is the same operation as in the case of the single-system ring configuration.

When the transceiving node 510, the Add/Drop node 520, and the MCF 600 have a single-system two-way ring configuration like the communication system 100C in FIG. 7 or a dual-system two-way ring configuration like the communication system 100D in FIG. 9, each node may transmit an optical signal for two-way communication to the core 601 and may perform an operation similar to the above-described operation. Each node is connected to a transceiving device (Tx/Rx) instead of a transmitting device (Tx) and a receiving device (Rx).

According to the first embodiment, it is possible to estimate the transmission quality of each core 601 that is configured to transmit a communication optical signal for respective MCFs 600 on the basis of the light intensity of a frequency component included in the transmission quality measurement tight. By this estimation, if is easy to detect an event which does not lead to a fault such as bending of a fiber but has influences on the quality.

Second Embodiment

In a second embodiment, an optical signal of a specific core among a plurality of cores of an MCF is monitored by all Add/Drop nodes, thereby transmission quality between the specific core and adjacent cores is estimated similarly to the first embodiment. Although a communication optical signal is modulated and added to a core in the first embodiment, light in a wavelength range different from the wavelength range used by a communication optical signal is added to a core that is configured to transmit the communication optical signal in the second embodiment.

Figure 15:
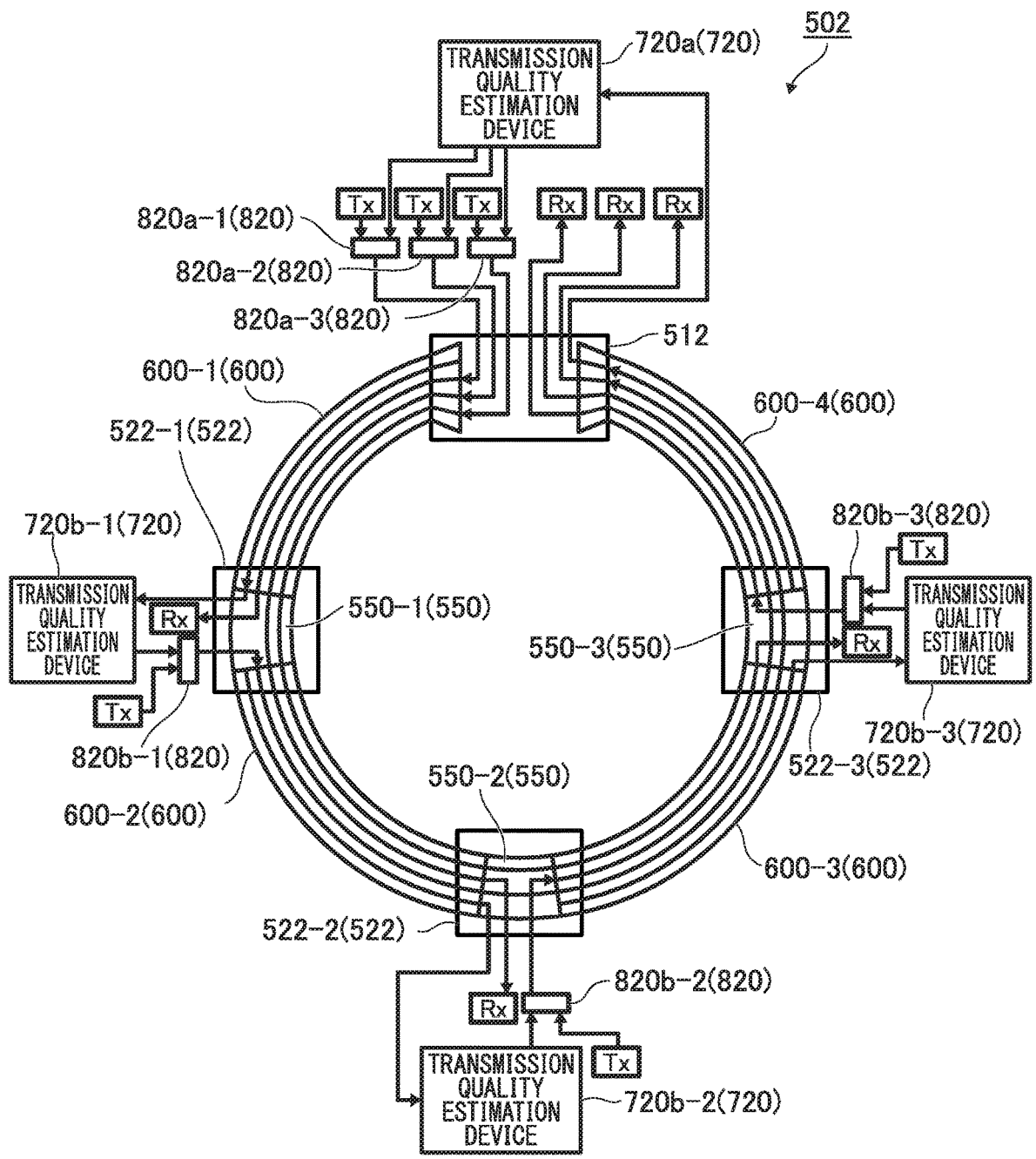
FIG. 15 is a diagram showing a configuration example of a transmission quality estimation system according to a second embodiment of the present invention.

FIG. 15 is a diagram showing a configuration example of a transmission quality estimation system 502 according to the second embodiment. In the drawing, the same portions as those of the transmission quality estimation system 500 of the first embodiment shown in FIG. 12 will be denoted by the same reference numerals, and the description thereof will be omitted. The transmission quality estimation system 502 includes a transceiving node 512, n (n is an integer of 1 or more) Add/Drop nodes 522, and n+1 transmission quality estimation devices 720. The diagram shows an example of n-3. In the following description, the transceiving node 512 and the Add/Drop node 522 will be collectively referred to as a "node." and n Add/Drop nodes 522 will be referred to as Add/Drop nodes 522-1 to 522-$n$. Moreover, the transmission quality estimation device 720 connected to the transceiving node 512 will be referred to as a transmission quality estimation device 720$a$. The transmission quality estimation device 720 connected to the Add/Drop node 522-$i$ (i is an integer of 1 or more and n or less) will be referred to as a transmission quality estimation device 720$b$-$i$. The transmission quality estimation devices 720$b$-1 to 720$b$-$n$ will be collectively referred to as a transmission quality estimation device 720$b$. The transmission quality estimation device 720 may be provided inside each node.

Nodes are connected together by an MCF 600. Although a case in which the transceiving node 512, the Add/Drop node 522, and the MCF 600 forms the communication system 100 having the single-system one-way ring configuration shown in FIG. 1 will be described as an example in the second embodiment, a communication system of another topology may be formed. The transceiving node 512 corresponds to the transceiving node 110 shown in FIG. 1. The Add/Drop nodes 522-1 to 522-$n$ correspond to the Add/Drop nodes 120 to 120-$n$ shown in FIG. 1, respectively.

Hereinafter, the MCF 600 between the Add/Drop node 522-$i$ and the previous node will be referred to as an MCF 600-$i$. The MCF 600 between the Add/Drop node 522-$n$ and the transceiving node 512 will be referred to as an MCF 600-($n$+1).

The Add/Drop node 522 includes a connector 550. The connector 550 provided in the Add/Drop node 522-$i$ will be referred to as a connector 550-$i$.

The combiner 820 combines a communication optical signal output from the transmitting device (Tx) and light output from the transmission quality estimation device 720 and outputs an optical signal obtained through the combination to the transceiving node 512 or the Add/Drop node 522. Hereinafter, the combiner 820 connected to the transceiving node 512 will be referred to as a combiner 820$a$. The combiner 820$a$ that combines light to be added to the i-th core 601-$i$ of the MCF 600 will be referred to as a combiner 820$a$-$i$. Moreover, the combiner 820 connected to the Add/

Drop node 522-$i$ will be referred to as a combiner 820$b$-$i$. The combiners 820$b$-1 to 820$b$-$n$ will be collectively referred to as a combiner 820$b$. The combiner 820 may be incorporated in the connector 550.

Figure 16:
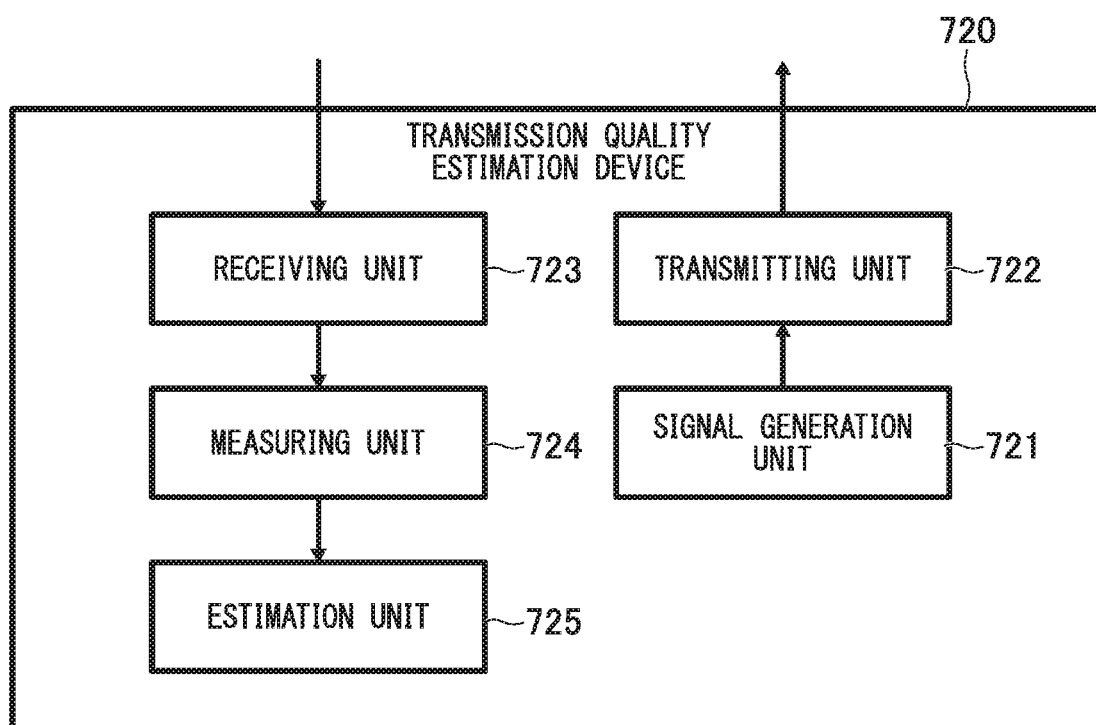
FIG. 16 is a block diagram showing a configuration of a transmission quality estimation device according to the second embodiment.

FIG. 16 is a block diagram showing a configuration of the transmission quality estimation device 720. The transmission quality estimation device 720 includes a signal generation unit 721, a transmitting unit 722, a receiving unit 723, a measuring unit 724, and an estimation unit 725. The signal generation unit 721 generates light in a different wavelength range different from a wavelength range used by the communication optical signal. Moreover, the signal generation unit 721 generates light having different wavelengths for the respective cores to which light is added. The transmitting unit 722 outputs light generated by the signal generation unit 721 to the combiner 820. The receiving unit 723 receives transmission quality measurement light dropped by a node. The measuring unit 724 measures the light received by the receiving unit 723. The estimation unit 725 estimates the transmission quality of each of the cores 601-1 to 601-$n$ on the basis of a measurement result obtained by the measuring unit 724. Arbitrary conventional techniques can be used in estimation of transmission quality.

Next, an operation of the transmission quality estimation system 502 will be described.

The combiner 820$a$-$i$ combines a communication optical signal addressed to the Add/Drop node 522-$i$ and the light output from the transmission quality estimation device 720$a$. The transceiving node 512 adds the light combined by the combiner 820$a$-$i$ to the core 601-$i$ of the MCF 600-1. Moreover, the combiner 820$b$-$i$ combines a communication optical signal addressed to the transceiving node 512 and the light output from the transmission quality estimation device 720$b$-$i$. The connector 552-$i$ of each Add/Drop node 522-$i$ adds the light combined by the combiner 820$b$-$i$ to the core 601-$i$ of the MCF 600-($i$+1). The light output from the transmission quality estimation device 720 has a wavelength different from the wavelength range used by the communication optical signal. The wavelength of the light is different for respective cores 601 to which the tight is input. When the wavelength of the light is not changed for respective wavelengths 601, low frequency modulation may be performed on the transmission quality measurement light for respective cores, similarly to the first embodiment.

The connector 550-$i$ of each Add/Drop node 522-$i$ drops a communication optical signal addressed to the subject node from the core 601-$i$ of the MCF 600-$i$. Moreover, the connector 550-$i$ relays a communication optical signal transmitted by the core 601-$j$ ($j \neq i$, $j$ is an integer of 1 or more and $n$ or less) of the MCF 600-$i$ to the core 601-$j$ of the MCF 600-($i$+1).

The transmission quality estimation system 502 does not add light to the core 601-$m$ of the MCF 600. However, light leaking from other cores 601-$i$ is transmitted to the core 601-$m$. The connector 550-$i$ of each Add/Drop node 522-$i$ drops transmission quality measurement light from the core 601-$m$ of the MCF 600-$i$ and inputs the transmission quality measurement light to the transmission quality estimation device 720$b$-$i$. Moreover, the transceiving node 512 drops the transmission quality measurement light from the core 601-$m$ of the MCF 600-($n$+1) and inputs the transmission quality measurement light to the transmission quality estimation device 720$a$.

The receiving unit 723 of each transmission quality estimation device 720 receives light dropped by the connector 550 or the transceiving node 512. The measuring unit 724 measures the light received by the receiving unit 723. The estimation unit 725 estimates the transmission quality of the respective cores 601-1 to 601-$n$ on the basis of the measurement result obtained by the measuring unit 724.

For example, the measuring unit 724 measures the intensity of light having a wavelength outside of the wavelength range used by the individual communication optical signals of the cores 601-1 to 601-$n$, included in the transmission quality measurement light. The estimation unit 725 identifies a core in which light leakage is the largest among the cores 601-1 to 601-$n$ on the basis of the light intensity of the respective wavelengths included in the transmission quality measurement light. That is, the estimation unit 725 estimates the transmission quality of the cores 601-1 to 601-$n$ that have transmitted the light of the respective wavelengths on the basis of the light intensity of the respective wavelengths included in the transmission quality measurement light.

Some of the transmission quality estimation devices 720 may receive light dropped from the core 601 in accordance with a segment of an optical fiber transmission path that is to be measured.

Moreover, some of the functions of the transmission quality estimation devices 720 of the respective nodes may be shared. For example, some of the transmission quality estimation devices 720$a$ and 720$b$-1 to 720$b$-$n$ may include the estimation unit 725. The transmission quality estimation device 720 that does not include the estimation unit 725 transmits a measurement result obtained by the measuring unit 724 to the transmission quality estimation device 720 that includes the estimation unit 725. The estimation unit 725 of the transmission quality estimation device 720 having received the measurement result measures the transmission quality on the basis of the received measurement result.

Although the single-system one-way ring configuration has been described, when the transceiving node 512, the Add/Drop node 522, and the MCF 600 form a dual-system one-way ring configuration, the transmission quality estimation system 502 may further transmit a communication optical signal in a reverse direction to the above-described direction and perform a transmission quality estimation process similar to the above-described process.

In the case of a dual-system one-way ring configuration, the transmission quality estimation system 502 includes two transceiving nodes 512 corresponding to the transceiving nodes 110$a$ and 110$b$ shown in FIG. 6. The transceiving node 512 connected to the MCF 600-1 is a transceiving node 512$a$, and the transceiving node 512 connected to the MCF 600-($n$+1) is a transceiving node 512$b$. Moreover, the Add/Drop nodes 522-1 to 522-$n$ correspond to the Add/Drop nodes 120-1 to 120-$n$ shown in FIG. 6, respectively. The MCF 600 includes m cores 601 (m is an integer of 2$n$+1 or more). The core 601-$m$ transmits a transmission quality measurement light. The core 601-(2$i$−1) (i is an integer of 1 or more and $n$ or less) transmits a communication optical signal addressed to the Add/Drop node 522-$i$. The core 601-2$i$ transmits an optical signal addressed from the Add/Drop node 522-$i$ to the transceiving nodes 512$a$ and 512$b$.

The transceiving node 512$a$ adds an optical signal obtained by the combiner 820$a$-$i$ combining the communication optical signal addressed to the Add/Drop node 522-$i$ and the light output by the transmission quality estimation device 720$a$ to the core 601-(2$i$−1) of the MCF 600-1. Moreover, the transceiving node 512$b$ adds an optical signal obtained by the combiner 820$a$-$i$ combining the communication optical signal addressed to the Add/Drop node 522-$i$ and the light output by the transmission quality estimation device 720$a$ to the core 601-(2$i$−1) of the MCF 600-($n$+1). Moreover, the connector 550-$i$ of each Add/Drop node 522-$i$ adds an optical signal obtained by the combiner 820*b-i* combining the communication optical signal addressed to the transceiving node 512*a* and the light output by the transmission quality estimation device 720*b* to the core 601-2*i* of the MCF 600-(*i*+1). Furthermore, the connector 550-*i* of each Add/Drop node 522-*i* adds an optical signal obtained by the combiner 820*b-i* combining the communication optical signal addressed to the transceiving node 512*b* and the light output by the transmission quality estimation device 720*b* to the core 601-2*i* of the MCF 600-(*i*+1).

The connector 550-*i* of each Add/Drop node 522-*i* drops a communication optical signal addressed to the subject node from the core 601-(2*i*−1) of the MCF 600-*i* and the core 601-(2*i*−1) of the MCF 600-(*i*+1) and drops transmission quality measurement light from the core 601-*m* of the MCF 600-*i*. Furthermore, the connector 550-*i* relays the communication optical signal transmitted by the core 601-(2*j*−1) (j≠i, j is an integer of 1 or more and u or less) of the MCF 600-*i* to the core 601-(2*j*−1) of the MCF 600-(*i*+1) and relays the communication optical signal transmitted by the core 601-2) of the MCF 600-(*i*+1) the core 601-2*j* of the MCF 600-*i*.

The transceiving node 512*a* drops the communication optical signal from the core 601-2*i* of the MCF 600-1 and drops the transmission quality measurement light from the core 601-*m*. Similarly, the transceiving node 512*b* drops the communication optical signal from the core 601-2*i* of the MCF 600-(*n*+1) and drops the transmission quality measurement light from the core 601-*m*.

The operation of the transmission quality estimation device 720 on the transmission quality measurement light dropped in each node is the same operation as in the case of the single-system ring configuration.

When the transceiving node 512, the Add/Drop node 522, and the MCF 600 have a single-system two-way ring configuration like the communication system 100C in FIG. 7 or a dual-system two-way ring configuration like the communication system 100D in FIG. 9, each node may transmit an optical signal for two-way communication to the core 601 and may perform an operation similar to the above-described operation. Each node is connected to a transceiving device (Tx/Rx) instead of a transmitting device (Tx) and a receiving device (Rx).

According to the second embodiment, it is possible to estimate the transmission quality of each core 601 that is configured to transmit a communication optical signal for respective MCFs 600 on the basis of the light intensity of a wavelength range different from the wavelength range used by a communication optical signal included in the transmission quality measurement light. By this estimation, it is easy to detect an event which does not lead to a fault such as bending of a fiber but has influences on the quality.

Third Embodiment

In a third embodiment, a transmission quality measurement light of a specific core among a plurality of cores of an MCF is monitored by all Add/Drop nodes to estimate transmission quality between the specific core and adjacent cores similarly to the first embodiment. Although light is not added to a core that is configured to transmit a transmission quality measurement light in the first embodiment, light is added to a core that is configured to transmit a transmission quality measurement light in the second embodiment.

Figure 17:
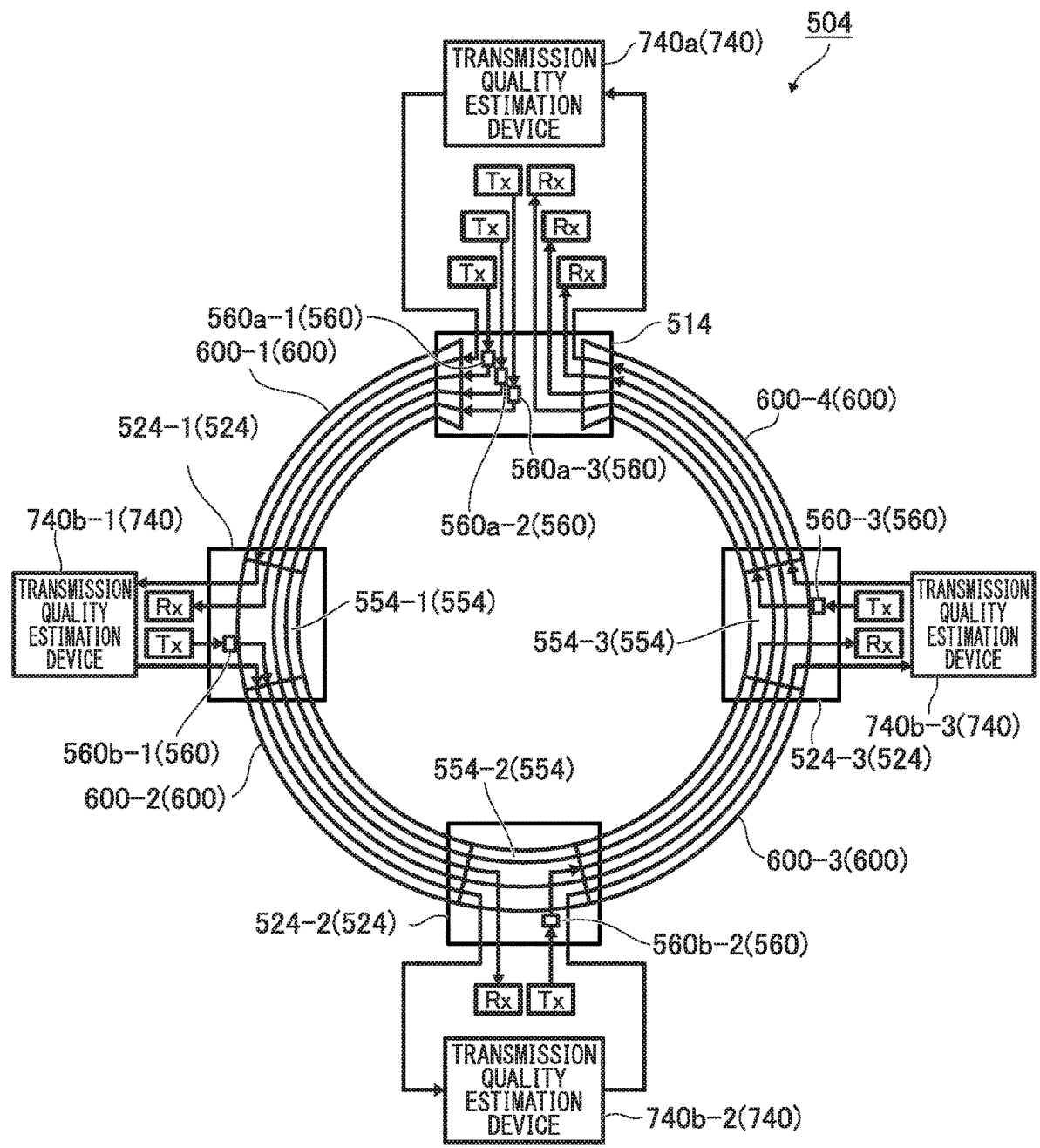
FIG. 17 is a diagram showing a configuration example of a transmission quality estimation system according to a third embodiment of the present invention.

FIG. 17 is a diagram showing a configuration example of a transmission quality estimation system 504 according to the third embodiment. In the drawing, the same portions as those of the transmission quality estimation system 500 of the first embodiment shown in FIG. 12 will be denoted by the same reference numerals, and the description thereof will be omitted. The transmission quality estimation system 504 includes a transceiving node 514, n (n is an integer of 1 or more) Add/Drop nodes 524, and n+1 transmission quality estimation devices 740. The diagram shows an example of n=3. In the following description, the transceiving node 514 and the Add/Drop node 524 will be collectively referred to as a "node", and n Add/Drop nodes 524 will be referred to as Add/Drop nodes 524-1 to 524-*n*, respectively. Moreover, the transmission quality estimation device 740 connected to the transceiving node 514 will be referred to as a transmission quality estimation device 740*a*. The transmission quality estimation device 740 connected to the Add/Drop node 524-*i* (i is an integer of 1 or more and n or less) will be referred to as a transmission quality estimation device 740*b-i*. The transmission quality estimation devices 740*b*-1 to 740*b-n* will be collectively referred to as a transmission quality estimation device 740*b*. The transmission quality estimation device 740 may be provided inside each node. Nodes are connected by an MCF 600. In the third embodiment, although a case in which the transceiving node 514, the Add/Drop node 524, and the MCF 600 forms the communication system 100 having the single-system one-way ring configuration shown in FIG. 1 will be described as an example, a communication system of another topology may be formed. The transceiving node 514 corresponds to the transceiving node 110 shown in FIG. 1. The Add/Drop nodes 524-1 to 524-*n* correspond to the Add/Drop nodes 120 to 120-*n* shown in FIG. 1, respectively.

Hereinafter, the MCF 600 between the Add/Drop node 524-*i* and the previous node will be referred to as an MCF 600-*i*. The MCF 600 between the Add/Drop node 524-*n* and the transceiving node 514 will be referred to as an MCF 600-(*n*+1).

The transceiving node 514 includes a modulator 560. The Add/Drop node 524 includes a connector 554 (a core connection unit) and a modulator 560, n modulators 560 provided in the transceiving node 514 will be referred to as modulators 560*a*-1 to 560*a-n*. The modulators 560*a*-1 to 560*a-n* will be collectively referred to as a modulator 560*a*. Moreover, the modulator 560 included in the Add/Drop node 524-*i* will be referred to as a modulator 560*b-i*. The modulators 560*b*-1 to 560*b-n* will be collectively referred to as a modulator 560*b*. The modulator 560 may be provided outside each node. The connector 554 adds and drops an optical signal to and from a specific core of the MCF 600 and relays optical signals of other cores. The connector 554 provided in the Add/Drop node 524-*i* will be referred to as a connector 554-*i*.

The transceiving node 514 and each Add/Drop node 524 drop an optical signal from the core 601-*m* of the MCF 600 as a transmission quality measurement optical signal. The optical signal dropped from the core 601-*m* includes optical signals leaking from other cores 601-1 to 601-*n* and optical signals from the transmission quality estimation devices 740 of the other nodes. The transmission quality estimation device 740 measures the dropped transmission quality measurement optical signal and estimates the transmission quality on the basis of the measurement result. The transmission quality measurement optical signal in the third embodiment includes two types of optical signals including an indirect measurement optical signal and a direct measurement optical signal. The indirect measurement optical signal is a communication optical signal leaking from the other cores 601-1 to 601-*n* to the core 601-*m* of the MCF 600. The direct measurement optical signal is an optical signal generated by the transmission quality estimation device 740.

Figure 18:
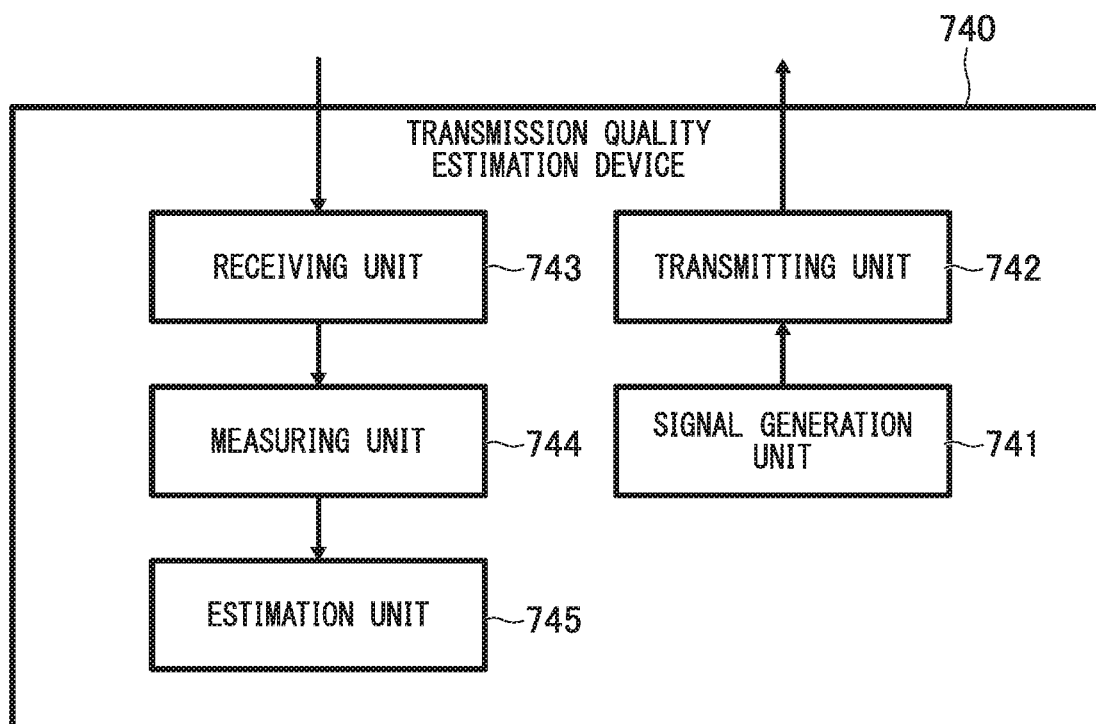
FIG. 18 is a block diagram showing a configuration of a transmission quality estimation device according to the third embodiment.

FIG. 18 is a block diagram showing a configuration of the transmission quality estimation device 740. The transmission quality estimation device 740 includes a signal generation unit 741, a transmitting unit 742, a receiving unit 743, a measuring unit 744, and an estimation unit 745. The signal generation unit 741 generates a transmission quality measurement optical signal in a wavelength range other that the wavelength range used by the communication optical signal. The transmitting unit 742 transmits light generated by the signal generation unit 741 to a node. The receiving unit 743 receives the transmission quality measurement optical signal dropped by a node. The measuring unit 744 measures the light received by the receiving unit 743. The estimation unit 745 estimates the transmission quality of respective cores 601-1 to 601-$n$ on the basis of the measurement result obtained by the measuring unit 744. Arbitrary conventional techniques can be used in estimation of transmission quality.

Next, an operation of the transmission quality estimation system 504 will be described.

The transmission quality estimation system 504 transmits a communication optical signal addressed to respective Add/Drop nodes 524 using the cores 601-1 to 601-$n$ of the MCF 600. Specifically, the transceiving node 514 performs low frequency modulation on a communication optical signal addressed to the Add/Drop node 524-$i$ (i is an integer of 1 or more and n or less) using the modulator 560$a$-$i$ similarly to the first embodiment and adds the optical signal obtained by the low frequency modulation to the core 601-$i$ of the MCF 600-1. The modulators 560$a$-1 to 560$a$-$n$ changes the frequency of the low frequency modulation in accordance with the cores 601-1 to 601-$n$.

The modulator 560$b$-$i$ of each of the Add/Drop node 524-$i$ performs low frequency modulation of a frequency corresponding to the core 601-$i$ on a communication optical signal addressed to the transceiving node 514 similarly to the modulator 560$a$. The connector 554-$i$ adds the communication optical signal addressed to the transceiving node 514 obtained by the low frequency modulation of the modulator 560$b$-$i$ to the core 601-$i$ of the MCF 600-($i$+1).

The connector 554-$i$ of each Add/Drop node 524-$i$ drops the communication optical signal addressed to the subject node from the core 601-$i$ of the MCF 600-$i$. Moreover, the connector 554-$i$ relays a communication optical signal transmitted by a core 601-$j$ (j≠i, j is an integer of 1 or more and n or less) of the MCF 600-$i$ to the core 601-$j$ of the MCF 600-($i$+1).

The transmission quality estimation system 504 transmits a communication optical signal using the cores 601-1 to 601-$n$ of the MCF 600 and transmits a transmission quality measurement optical signal of a wavelength that does not belong to a wavelength range used by the communication optical signal using the core 601-$m$ of the MCF 600. Specifically, the transceiving node 514 inputs the transmission quality measurement optical signal that has been generated by the signal generation unit 741 of the transmission quality estimation device 740$a$ and output from the transmitting unit 742 to the core 601-$m$ of the MCF 600-1. Similarly, the connector 554-$i$ of the Add/Drop node 524-$i$ inputs the transmission quality measurement optical signal that has been generated by the signal generation unit 741 of the transmission quality estimation device 740$b$-$i$ and output from the transmitting unit 742 to the core 601-$m$ of the MCF 600-($i$+1).

The connector 554-$i$ of each Add/Drop node 524-$i$ drops the transmission quality measurement optical signal from the core 601-$m$ of the MCF 600-$i$ and inputs the transmission quality measurement optical signal to the transmission quality estimation device 740$b$-$i$. Moreover, the transceiving node 514 drops the transmission quality measurement optical signal transmitted by the Add/Drop node 524-$n$ from the core 601-$m$ of the MCF 600-($n$+1) and inputs the transmission quality measurement optical signal to the transmission quality estimation device 740$a$.

The receiving unit 743 of each transmission quality estimation device 740 receives an optical signal dropped by the connector 554 or the transceiving node 514. The measuring unit 744 measures the light received by the receiving unit 743. The estimation unit 745 estimates the transmission quality of respective cores 601-1 to 601-$n$ on the basis of the measurement result obtained by the measuring unit 744.

For example, the measuring unit 744 measures the light intensity of individual frequency components for the cores 601-1 to 601-$n$, included in the indirect measurement optical signal of the transmission quality measurement optical signal. The estimation unit 745 identifies a core in which light leakage is the largest among the cores 601-1 to 601-$n$ on the basis of the light intensity of the respective low frequency components included in the indirect measurement optical signal. That is, the estimation unit 745 indirectly estimates the transmission quality of the cores 601-1 to 601-$n$ that have transmitted the communication optical signal modulated by the low frequency from the light intensity of the respective low frequency components included in the indirect measurement optical signal. Noise and signal deterioration such as bending loss can be estimated on the basis of the magnitude of a frequency component of the low frequency modulation measured as an indirect measurement optical signal.

Furthermore, the measuring unit 744 measures the deterioration state of the direct measurement optical signal of the transmission quality measurement optical signal. Examples of parameters of the deterioration slate to be measured include a reception light intensity, a polarization rotation angle, an optical wavelength dispersion amount and a nonlinear distortion amount. The measuring unit 744 directly estimates the transmission quality of the core 601-$m$ of the MCF 600-$i$ by measuring these parameters. When there is little light leaking from the cores 601-1 to 601-$n$ of the MCF 600 and the light intensity is not sufficient for estimating the quality, the measuring unit 744 estimates the transmission quality using the direct measurement optical signal whereby a little deterioration stale of the MCF 600 can be measured.

Some of the modulators 560 provided in the transceiving nodes 514 and the Add/Drop nodes 524 may operate in accordance with the MCF 600 or the core 601 that is to be measured.

Moreover, some of the functions of the transmission quality estimation devices 740 of the respective nodes may be shared. For example, some of the transmission quality estimation devices 740$a$ and 740$b$-1 to 740$b$-$n$ may include the estimation unit 745. The transmission quality estimation device 740 that does not include the estimation unit 745 transmits a measurement result obtained by the measuring unit 744 to the transmission quality estimation device 740 that includes the estimation unit 745. The estimation unit 745 of the transmission quality estimation device 740 having received the measurement result measures the transmission quality on the basis of the received measurement result.

Moreover, when there is a small difference in the transmission quality between the respective cores 601 of the MCF 600 and there is extremely little light leaking from the respective cores 601, the estimation unit 745 may estimate the quality using the direct measurement optical signal only of the transmission quality measurement optical signal. In this case, the modulator 560 provided in the respective nodes is not necessary, and the transmission quality can be estimated using a simpler configuration.

Moreover, the direct measurement optical signal of the transmission quality measurement optical signal may use the same wavelength range as that used in the communication optical signal. By performing measurement using the wavelength range of the communication optical signal, since the influence on the communication optical signal receives actually can be measured directly, it is possible to estimate the quality with higher accuracy.

Although the single-system one-way ring configuration has been described, when the transceiving node 514, the Add/Drop node 524, and the MCF 600 form a dual-system one-way ring configuration, the transmission quality estimation system 504 may further transmit a communication optical signal in a reverse direction to the above-described direction and perform a transmission quality estimation process similar to the above-described process.

In the case of a dual-system one-way ring configuration, the transmission quality estimation system 504 includes two transceiving nodes 514 corresponding to the transceiving nodes 110a and 110b shown in FIG. 6. The transceiving node 514 connected to the MCF 600-1 is a transceiving node 514a, and the transceiving node 514 connected 10 the MCF 600-(n+1) is a transceiving node 514b. Moreover, the Add/Drop nodes 524-1 to 524-n correspond to the Add/Drop nodes 120-1 to 120-n shown in FIG. 6, respectively. The MCF 600 includes m cores 601 (m is an integer of 2n+1 or more). The core 601-m transmits a transmission quality measurement light signal. The core 601-(2i−1) (i is an integer of 1 or more and n or less) transmits a communication optical signal addressed to the Add/Drop node 524-i. The core 601-2i transmits an optical signal addressed from the Add/Drop node 524-i to the transceiving nodes 514a and 514b. The modulator 560 performs low frequency modulation on the communication optical signal using frequencies capable of identifying the respective cores 601-1 to 601-2n that add the optical signal.

The transceiving node 514a performs low frequency modulation on a communication optical signal addressed to the Add/Drop node 524-i using the modulator 560a and adds an optical signal obtained by the low frequency modulation to the core 601-(2i−1) of the MCF 600-1. Furthermore, the transceiving node 514a inputs the transmission quality measurement optical signal output from the transmission quality estimation device 740a to the core 601-m of the MCF 600-1. Moreover, the transceiving node 514b performs low frequency modulation on the communication optical signal addressed to the Add/Drop node 524-i using the modulator 560a and adds an on optical signal obtained by the low frequency modulation to the core 601-(2i−1) of the MCF 600-(n+1). Moreover, the connector 554-i of each Add/Drop node 524-i adds a communication optical signal addressed to the transceiving node 514a, obtained by the low frequency modulation of the modulator 560b-i to the core 601-2i of the MCF 600-i. The connector 554-i adds a communication optical signal addressed to the transceiving node 514b, obtained by the low frequency modulation of the modulator 560b-i to the core 601-2i of the MCF 600-(i+1). The connector 554-i inputs the transmission quality measurement optical signal output from the transmission quality estimation device 740b-i to the core 601-m of the MCF 600-(i+1).

The connector 554-i of each Add/Drop node 524-i drops a communication optical signal addressed to the subject node from the core 601-(2i−1) of the MCF 600-i and the core 601-(2i−1) of the MCF 600-(i+1) and drops a transmission quality measurement light signal from the core 601-m of the MCF 600-i. Furthermore, the connector 554-i relays a communication optical signal transmitted by the core 601-(2j−1) (j≠i, j is an integer of 1 or more and n or less) of the MCF 600-i to the core 601-(2j−1) of the MCF 600-(i+1) and relays a communication optical signal transmitted by the core 601-2j of the MCF 600-(i+1) to the core 601-2j of the MCF 600-i. The transceiving node 514b drops a communication optical signal from the core 601-2i of the MCF 600-(n+1) and drops a transmission quality measurement optical signal from the core 601-m.

The operation of the transmission quality estimation device 740 on the transmission quality measurement optical signal dropped in each node is the same operation as in the case of the single-system ring configuration.

When the transceiving node 514, the Add/Drop node 524, and the MCF 600 have a single-system two-way ring configuration like the communication system 100C in FIG. 7 or a dual-system two-way ring configuration like the communication system 100D in FIG. 9, each node may transmit an optical signal for two-way communication to the core 601 and may perform the operation similar to the above-described operation. Each node is connected to a transceiving device (Tx/Rx) instead of a transmitting device (Tx) and a receiving device (Rx).

According to the third embodiment, it is possible to estimate the transmission quality of each core 601 that is configured to transmit a communication optical signal for respective MCFs 600 on the basis of the light intensity of a low frequency component included in the indirect measurement optical signal of the transmission quality measurement optical signal. Moreover, it is possible to estimate the transmission quality of the MCF 600 on the basis a deterioration stale of a signal included in the direct measurement optical signal of the transmission quality measurement optical signal. By this estimation, it is easy to detect an event which docs not lead to a fault such as bending of a fiber but has influences on the quality.

Fourth Embodiment

In a fourth embodiment an optical signal having a shorter wavelength than a wavelength range of a communication optical signal is transmitted to a core of an MCF that is configured to transmit a communication optical signal as a transmission quality measurement optical signal. In this manner, by adding an optical signal having a short wavelength to a core that is configured to transmit an optical signal for a communication purpose, it is possible to transmit optical signals in multiple modes. Light transmitted in multiple modes is transmitted at a lower speed than that of light transmitted in a single mode used in an optical signal for a communication purpose and is more likely to be affected by a change in vibration and temperature. Therefore, by splitting an optical signal having a short wavelength from an optical signal dropped from a core and measuring the split optical signal, it is possible to estimate the transmission quality between end-to-end nodes.

Figure 19:
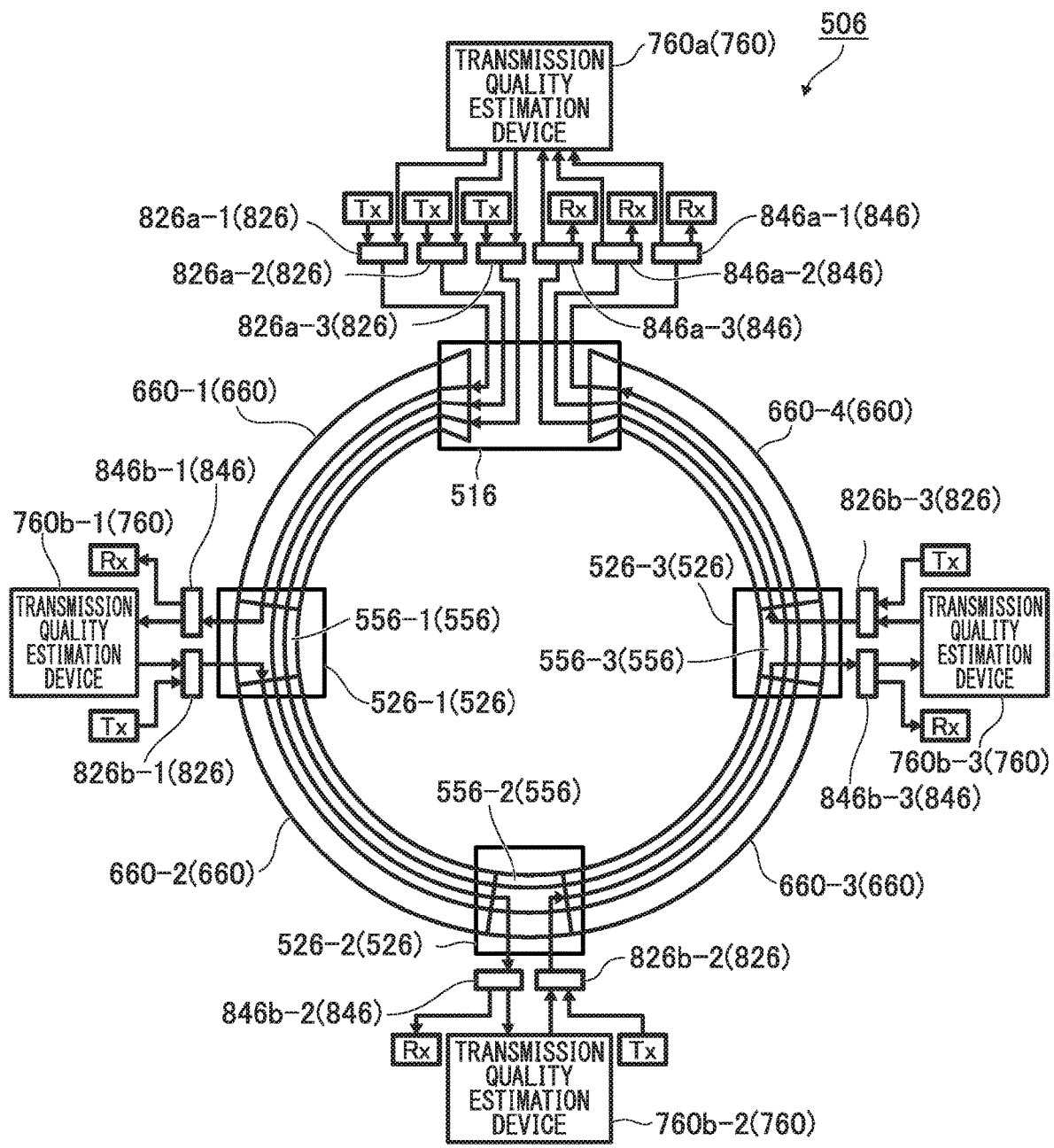
FIG. 19 is a diagram showing a configuration example of a transmission quality estimation system according to a fourth embodiment of the present invention.

FIG. 19 is a diagram showing a configuration example of a transmission quality estimation system 506 according to the fourth embodiment. The transmission quality estimation system 506 includes a transceiving node 516, n (n is an integer of 1 or more) Add/Drop nodes 526, and n+1 transmission quality estimation devices 760. The diagram shows an example of n=3. In the following description, the transceiving node 516 and the Add/Drop node 526 will be collectively referred to as a "node". Moreover, n Add/Drop nodes 526 will be referred to as Add/Drop nodes 526-1 to 526-n, respectively. Moreover, the transmission quality estimation device 760 connected to the transceiving node 516 will be referred to as a transmission quality estimation device 760a. The transmission quality estimation device 760 connected to the Add/Drop node 526-i (i is an integer of 1 or more and n or less) will be referred to as a transmission quality estimation device 760b-i. The transmission quality estimation devices 760b-1 to 706b-n will be collectively referred to as a transmission quality estimation device 760b. The transmission quality estimation device 760 may be provided inside each node.

Nodes are connected together by an MCF 660. In the fourth embodiment, although a case in which the transceiving node 516, the Add/Drop node 526, and the MCF 660 forms the communication system 100 having the single-system one-way ring configuration shown in FIG. 1 will be described as an example, a communication system of another topology may be formed. The transceiving node 516 corresponds to the transceiving node 110 shown in FIG. 1. The Add/Drop nodes 526-1 to 526-n correspond to the Add/Drop nodes 120 to 120-n shown in FIG. 1, respectively.

Hereinafter, the MCF 660 between the Add/Drop node 526-i and the previous node will be referred to as an MCF 660-i. The MCF 660 between the Add/Drop node 526-n and the transceiving node 516 will be referred to as an MCF 660-(n+1).

The Add/Drop node 526 includes a connector 556. The connector 556 adds and drops an optical signal to and from respect to a specific core of the MCF 660. The connector 556 provided in the Add/Drop node 526-i will be referred to as a connector 556-i.

The combiner 826 combines a communication optical signal output from the transmitting device (Tx) and a transmission quality measurement optical signal output from the transmission quality estimation device 760 and outputs an optical signal obtained by combining to the transceiving node 516 or the Add/Drop node 526. The wavelength of the transmission quality measurement optical signal is shorter than the wavelength of the communication optical signal. Hereinafter, the combiner 826 connected to the transceiving node 516 will be referred to as a combiner 826a. The combiner 826a that outputs an optical signal to be added to the i-th core of the MCF 660 will be referred to as a combiner 826a-i. Moreover, the combiner 826 connected to the Add/Drop node 526-i will be referred to as a combiner 826b-i. The combiners 826b-1 to 826b-n will be collectively referred to as a combiner 826b.

The splitter 846 splits the optical signal dropped from the MCF 660 into a communication optical signal having a long wavelength and a transmission quality measurement optical signal having a short wavelength. The splitter 846 outputs the transmission quality measurement optical signal to the transmission quality estimation device 760 and outputs the communication optical signal to the receiving device (Rx). Hereinafter, the splitter 846 connected to the transceiving node 516 will be referred to as a splitter 846a, and the splitter 846a mat splits an optical signal dropped from the i-th core of the MCF 660 will be referred to as a splitter 846a-i. Moreover, the splitter 846 connected to the Add/Drop node 526-i will be referred to as a splitter 846b-i. The splitters 846b-1 to 846b-n will be collectively referred to as a splitter 846b.

The connector 556 may incorporate one or both of the combiner 826 and the splitter 846.

Figure 20:
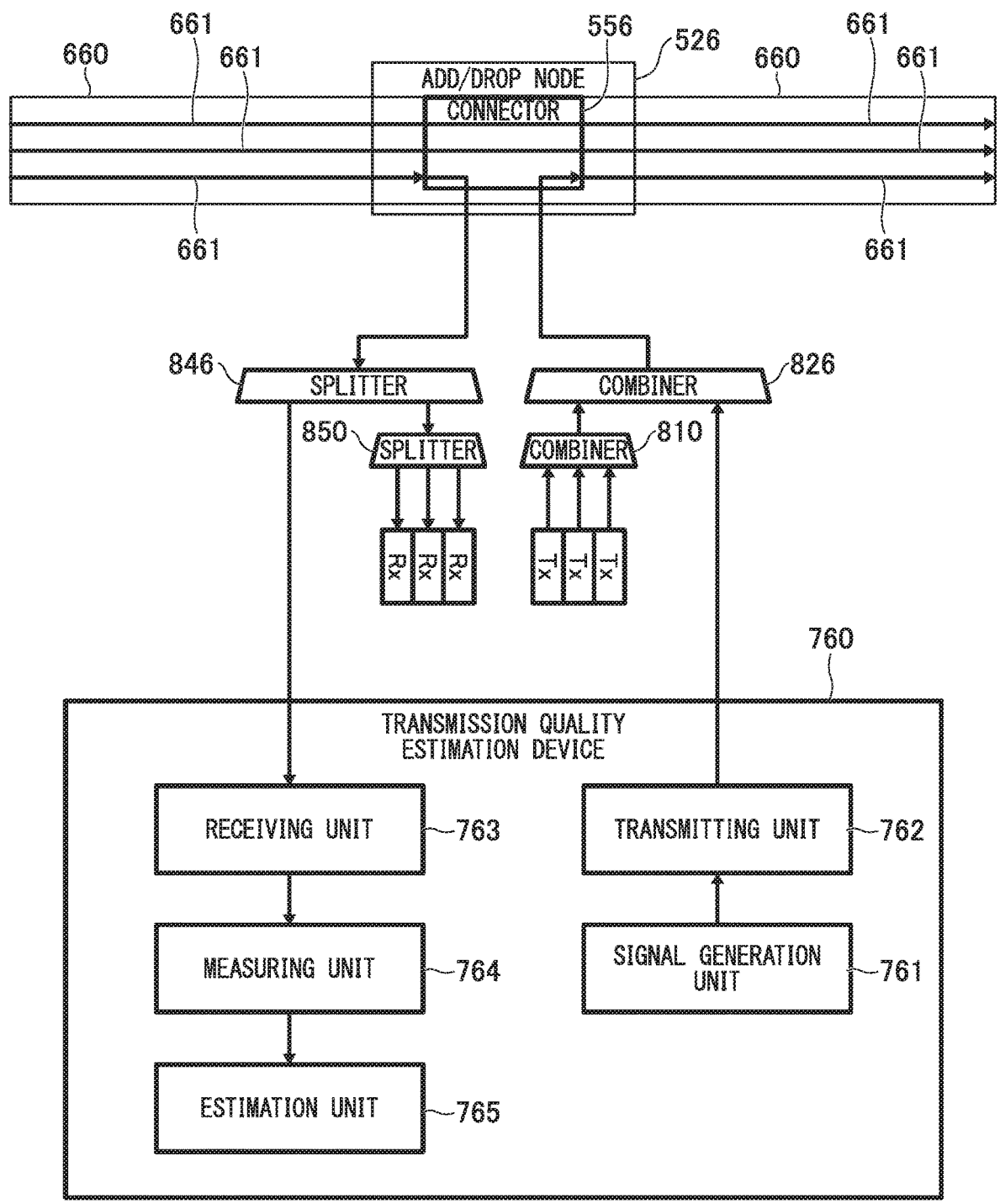
FIG. 20 is a block diagram showing a configuration of a transmission quality estimation device according to the fourth embodiment.

FIG. 20 is a block diagram showing a configuration of the transmission quality estimation device 760. The diagram shows a connection configuration between a node and the transmission quality estimation device 760 when the node connected to the transmission quality estimation device 760 is the Add/Drop node 526 that performs wavelength division multiplexing communication.

The MCF 660 includes n or more cores 661. Hereinafter, for the simplicity sake, the core 661 that transmits a communication optical signal of an Add/Drop node 526-i (i is an integer of 1 or more) will be referred to as a core 661-i.

The combiner 810 combines communication optical signals of different frequencies output from a plurality of transmitting devices (Tx) and outputs an optical signal obtained by the combining to the combiner 826. The combiner 826 combines a transmission quality measurement optical signal generated by the transmission quality estimation device 760 and a communication optical signal having a long wavelength output by the combiner 810. The transceiving node 516 or the connector 556 of the Add/Drop node 526 adds an optical signal output by the combiner 810 to the optical signal transmission core 661 allocated to the subject node.

The transceiving node 516 or the connector 556 of the Add/Drop node 526 drops an optical signal addressed to the subject node from the optical signal transmission core 661. The splitter 846 splits the optical signal dropped from the core 661 into a transmission quality measurement optical signal having a short wavelength and a communication optical signal having a long wavelength. The communication optical signal is further split into respective wavelengths by the splitter 850. The receiving devices (Rx) corresponding to the respective wavelengths receive the split communication optical signals for respective wavelengths. The transmission quality measurement optical signal split by the splitter 846 is input to the transmission quality estimation device 760.

The transmission quality estimation device 760 includes a signal generation unit 761, a transmitting unit 762, a receiving unit 763, a measuring unit 764, and an estimation unit 765. The signal generation unit 761 generates a transmission quality measurement optical signal. The transmitting unit 762 outputs an optical signal generated by the signal generation unit 761 to the combiner 826. The receiving unit 763 receives the transmission quality measurement optical signal split by the splitter 846. The measuring unit 764 measures the optical signal received by the receiving unit 763. The estimation unit 765 estimates the transmission quality between the nodes having transmitted the transmission quality measurement optical signal on the basis of the measurement result obtained by the measuring unit 764.

In the case of the transmission quality estimation device 760a, the signal generation unit 761 generates the transmission quality measurement optical signal to be added to the respective cores 661-1 to 661-n. The transmitting unit 762 outputs an optical signal to be added to the core 661-i to the combiner 826a-i. Moreover, the receiving unit 763 receives the transmission quality measurement optical signal transmitted by the cores 661-1 to 661-n from the splitters 846a-1 to 846a-n.

Next, the operation of the transmission quality estimation system 506 will be described.

The combiner 826a-i combines a communication optical signal addressed to the Add/Drop node 526-i and a transmission quality measurement optical signal output from the transmission quality estimation device 760a. The transceiving node 516 adds the optical signal combined by the combiner 826a-i to the core 661-i of the MCF 660-1. Moreover, the combiner 826b-i combines a communication optical signal addressed to the transceiving node 516 and a transmission quality measurement optical signal output from the transmission quality estimation device 760b-i. The connector 556-i of each Add/Drop node 526-i adds an optical signal combined by the combiner 826b-i to the core 661-i of the MCF 660-(i+1).

The connector 556-i of each Add/Drop node 526-i drops an optical signal addressed to the subject node from the core 661-i of the MCF 660-i. Moreover, the connector 556-i relays a communication optical signal transmitted by the core 661-j (j≠i, j is an integer of 1 or more and nor less) of the MCF 660-i to the core 661-j of the MCF 660-(i+1). The splitter 846b-i splits an optical signal output from the connector 556-i and outputs a transmission quality measurement optical signal to the transmission quality estimation device 760b-i.

The receiving unit 763 of the transmission quality estimation device 760b-i receives the transmission quality measurement optical signal split by the splitter 846b-i. The measuring unit 764 measures the optical signal received by the receiving unit 763. The estimation unit 765 estimates the transmission quality of an optical fiber transmission path between the transceiving nodes 516 on the basis of the measurement result on the optical signal obtained by the measuring unit 764 according to an arbitrary existing technique.

The transceiving node 516 drops an optical signal addressed to the subject node from the core 661-1 to 661-n of the MCF 660-(n+1). The splitter 846a-i splits the optical signal dropped from the core 661-i and outputs a transmission quality measurement optical signal to the transmission quality estimation device 760a. A transmission source of the optical signal split by the splitter 846a-i is the Add/Drop node 526-i.

The receiving unit 763 of the transmission quality estimation device 760a receives the transmission quality measurement optical signal of which the transmission source is the Add/Drop node 526-i from the splitter 846a-i. The measuring unit 764 measures the optical signal received by the receiving unit 763. For example, the measuring unit 764 measures a change in the phase or the intensity stale of light, a waveform distortion, an error rate, and the like. The estimation unit 765 estimates the transmission quality of an optical fiber transmission path between the Add/Drop nodes 526-i on the basis of the measurement result on the optical signal of which the transmission source is the Add/Drop node 526-i according to an arbitrary existing technique.

Some of the transmission quality estimation devices 760 may add the transmission quality measurement optical signal to the core 661 in accordance with an end-to-end optical fiber transmission path that is to be measured.

Moreover, some of the functions of the transmission quality estimation devices 760 may be shared. For example, some of the transmission quality estimation devices 760a and 760b-1 to 760-n may include the estimation unit 765. The transmission quality estimation device 760 that does not include the estimation unit 765 transmits a measurement result obtained by the measuring unit 764 to the transmission quality estimation device 760 that includes the estimation unit 765. The estimation unit 765 of the transmission quality estimation device 760 having received the measurement result measures the transmission quality on the basis of the received measurement result.

Although the single-system one-way ring configuration has been described, when the transceiving node 516, the Add/Drop node 526, and the MCF 660 form a dual-system one-way ring configuration, the transmission quality estimation system 506 may further transmit a communication optical signal in a reverse direction to the above-described direction and perform a transmission quality estimation process similar to the above-described process.

In the case of a dual-system one-way ring configuration, the transmission quality estimation system 506 includes two transceiving nodes 516 corresponding to the transceiving nodes 110a and 110b shown in FIG. 6. The transceiving node 516 connected to the MCF 660-1 is a transceiving node 516a, and the transceiving node 516 connected to the MCF 660-(n+1) is a transceiving node 516b. Moreover, the Add/Drop nodes 526-1 to 526-n correspond to the Add/Drop nodes 120-1 to 120-n shown in FIG. 6, respectively. The MCF 660 includes 2n cores 661. The core 661-(2i−1) (i is an integer of 1 or more) transmits a communication optical signal addressed to the Add/Drop node 526-i. The core 661-2i transmits an optical signal from the Add/Drop node 526-i to the transceiving nodes 516a and 516b.

The transceiving node 516a adds an optical signal obtained by the combiner 826a-i combining the transmission quality measurement optical signal and the communication optical signal addressed to the Add/Drop node 526-i to the core 661-(2i−1) of the MCF 660-1. Moreover, the transceiving node 516b adds an optical signal obtained by the combiner 826a-i combining the transmission quality measurement optical signal and the communication optical signal addressed to the Add/Drop node 526-i to the core 661-(2i−1) of the MCF 660-(n+1). Moreover, the connector 556-i of each Add/Drop node 526-i adds an optical signal obtained by the combiner 826b-i combining the transmission quality measurement optical signal and the communication optical signal addressed to the transceiving node 516a to the core 661-2i of the MCF 660-i. Moreover, the connector 556-i adds an optical signal obtained by the combiner 826b-i combining the transmission quality measurement optical signal and the communication optical signal addressed to the transceiving node 516b to the core 661-2i of the MCF 660-(i+1).

The connector 556-i of each Add/Drop node 526-i drops an optical signal from the core 661-(2i−1) of the MCF 660-i and the core 661-(2i−1) of the MCF 660-(i+1). Furthermore, the connector 556-i relays an optical signal transmitted by the core 661-(2j−1) (j≠1, j is an integer of 1 or more and n or less) of the MCF 660-i to the core 661-(2j−1) of the MCF 660-(i+1) and relays a communication optical signal transmitted by the core 661-2j of the MCF 660-(i+1) to the core 661-2j of the MCF 660-i.

Moreover, the transceiving node 516a drops an optical signal from the core 661-2i of the MCF 660-1 and the transceiving node 516b drops an optical signal from the core 661-2i of the MCF 660-(n+1). The operation of the transmission quality estimation device 760 on the transmission quality measurement optical signal that the splitter 846 has split from the optical signal dropped in each node is the same operation as in the case of the single-system ring configuration.

When the transceiving node 516, the Add/Drop node 526, and the MCF 660 have a single-system two-way ring configuration like the communication system 100C in FIG. 7 or a dual-system two-way ring configuration like the communication system 100D in FIG. 9, each node may transmit an optical signal for two-way communication to the core 661 and may perform the operation similar to the above-described operation. The transceiving node 516 and the Add/Drop node 526 include an optical circulator that outputs an optical signal output from the transceiving node 516 or the connector 556 to the splitter 846 and outputs an optical signal output from the combiner 826 to the transceiving node 516 or the connector 556.

According to the fourth embodiment, it is possible to estimate the transmission quality of an end-to-end optical fiber transmission path. By this estimation, it is easy to detect an event which does not lead to a fault such as bending of a fiber but has influences on the quality.

In the respective embodiments described above, a configuration in which an MCF is used for connection of nodes has been described. A SCF may be used for connection between nodes as shown in FIGS. 10 and 11 without being limited to the configuration described in the embodiments. When a SCF is used for connection between nodes, it is not possible to estimate the transmission quality based on crosstalk in a segment in which nodes are connected by the SCF. However, when an MCF is used in a partial segment of the connection between nodes, it is possible to estimate the transmission quality based on crosstalk in that segment. Moreover, when an optical signal output from the transmission quality estimation device is transmitted, it is possible to measure the transmission quality even when a segment in which nodes are connected by a SCF is present. That is, the transmission quality measurement described in the respective embodiments is useful regardless of the presence of a segment in which nodes are connected by a SCF.

Some of the functions of the transmission quality estimation devices 700, 720, 740, and 760 of the above-described embodiments may be realized by a computer. In this case, the functions may be realized when a program for realizing the functions of the transmission quality estimation devices 700, 720, 740, and 760 are recorded on a computer-readable recording medium and the program recorded on the recording medium is read and executed by a computer system. The "computer system" mentioned herein includes an OS and hardware such as peripheral devices. Moreover, the "computer-readable recording medium" indicates a portable medium such as a flexible disk, a magneto-optical disk, a ROM, or a CD-ROM and a storage device such as a hard disk drive included the computer system. Furthermore, the "computer-readable recording medium" may include those that dynamically store a program for a short period of time like a communication wire used when the program is transmitted through a network such as the Internet and a communication line such as a telephone line and those that store a program for a given period of time like a volatile memory inside the computer system that functions as a server and a client in that case. The program may be those for implementing part of the functions and those that can further implement the functions in combination with the program already stored in the computer system.

While embodiments of the present invention have been described with reference to the drawings, a specific structure is not limited to the embodiments but the present invention embraces design modifications made without departing from the spirit of the present invention.

INDUSTRIAL APPLICABILITY

The present invention can be used in a communication system that transmits signals between nodes using a multi-core fiber.

REFERENCE SIGNS LIST 100, 100A, 100C, 100D Communication system
110, 110a, 110b Transceiving node
111-1 to 111-6 Transmitting device
112-1 to 112-6 Receiving device
113-1 to 113-6 Transceiving device
120, 120-1 to 120-3 Add/Drop node
121-1 to 121-3 Transmitting device
122-1 to 122-3 Receiving device
125-1 to 125-3 Transceiving device
126-1 to 126-3 Transceiving device
127 Optical circulator
150, 150-1 to 150-3 Connector
160-1 to 160-4 Connector
180-1 to 180-3 Connector
185-1 to 185-3 Connector
200-1 to 200-4 MCF (multi-core fiber)
201, 201-1 to 201-4, 201-21, 201-22 Core
202, 202-1 to 202-4, 202-21, 202-22 Core
203, 203-1 to 203-4, 203-21, 203-22 Core
200-1 to 200-4 MCF (multi-core fiber)
211, 211-1 to 211-4 Core
212, 212-1 to 212-4 Core
213, 213-1 to 213-4 Core
214, 214-1 to 214-4 Core
215, 215-1 to 215-4 Core
216, 216-1 to 216-4 Core
400-1, 400-2, 410-1, 410-2 Conversion connector
451, 452, 453 SCF (single-core fiber)
500, 502, 504, 506 Transmission quality estimation system
510, 512, 514, 516 Transceiving node
520, 520-1 to 520-3, 522, 522-1 to 522-3, 524, 524-1 to 524-3, 526, 526-1 to 526-3 Add/Drop node
550, 556 Connector
560, 560a-1 to 560a-3, 560b-1 to 560b-3 Modulator
600, 600-1 to 600-4, 660, 660-1 to 660-4 MCF (multi-core fiber)
601, 601-1 to 601-3, 601-$m$, 661 Core
700, 700a, 700b-1 to 700b-3, 720, 720a, 720b-1 to 720b-3, 740, 740a, 740b-1 to 740b-3, 760, 760a, 760b-1 to 760b-3 Transmission quality estimation device
721, 741, 761 Signal generation unit
722, 742, 762 Transmitting unit
703, 723, 743, 763 Receiving unit
704, 724, 744, 764 Measuring unit
705, 725, 745, 765 Estimation unit
810, 820, 820a-1 to 820a-3, 820b-1 to 820b-3, 826, 826a-1 to 826a-3, 826b-1 to 826b-3 Combiner
846, 846a-1 to 846a-3, 846b-1 to 846b-3, 850 Splitter

The invention claimed is:

1. A transmission quality estimation system comprising:
three or more nodes; and
a transmission quality estimation device configured to estimate transmission quality, wherein
a multi-core fiber having a plurality of cores is used in at least a partial segment of a connection between the nodes, where the plurality of cores having more than two cores including a first core that transmits at least a communication optical signal and a second core that transmits transmission quality measurement light including light leaking from the first core, wherein the communication optical signal is modulated such that each of first cores used for transmission can be identified;
a node of the three or more nodes includes:
a connector configured to drop, add or relay light transmitted from or to each of the plurality of cores of the multi-core fiber, the transmission quality estimation device includes:
an estimation unit configured to identify a core from which light leaks among the plurality of cores included in the multi-core fiber between the nodes on a basis of the transmission quality measurement light dropped by the connector.

2. The transmission quality estimation system according to claim 1, wherein
the communication optical signal is modulated such that the each of first cores used for transmission can be identified by intensity modulation having a modulation period longer than a modulation period when signals transmitted by the communication optical signal are generated.

3. The transmission quality estimation system according to claim 2, wherein
the intensity modulation is performed on an electrical signal used for generating the communication optical signal.

4. The transmission quality estimation system according to claim 2, wherein
the intensity modulation is performed after the communication optical signal is generated on a basis of an electrical signal.

5. The transmission quality estimation system according to claim 1, wherein
the estimation unit uses a communication wavelength range in estimation of the transmission quality.

6. The transmission quality estimation system according to claim 1, wherein
the first core transmits a communication optical signal and light in a wavelength range other than a communication wavelength range.

7. The transmission quality estimation system according to claim 6, wherein
the estimation unit uses the wavelength range other than the communication wavelength range in estimation of the transmission quality.

8. The transmission quality estimation system according to claim 6, wherein
the wavelength range other than the communication wavelength range is a shorter wavelength range that allows optical signals to be transmitted in multiple modes.

9. The transmission quality estimation system according to claim 1, wherein
the first core and the second core transmit the communication optical signal and the transmission quality measurement light.

10. The transmission quality estimation system according to claim 9, wherein
the estimation unit uses a wavelength range other than a communication wavelength range in estimation of the transmission quality.

11. The transmission quality estimation system according to claim 9, wherein
the estimation unit uses a wavelength range other than a communication wavelength range in estimation of the transmission quality.

12. The transmission quality estimation system according to claim 11, wherein
the wavelength range other than the communication wavelength range is a shorter wavelength range that allows optical signals to be transmitted in multiple modes.

13. The transmission quality estimation system according to claim 1, wherein
the second core transmits the transmission quality measurement light including light leaking from the first core and light inputted by the connector.

14. The transmission quality estimation system according to claim 13, wherein
the estimation unit uses a wavelength range other than a communication wavelength range in estimation of the transmission quality.

15. The transmission quality estimation system according to claim 14, wherein
the wavelength range other than the communication wavelength range is a shorter wavelength range that allows optical signals to be transmitted in multiple modes.

16. A transmission quality estimation device in a transmission quality estimation system which includes three or more nodes and the transmission quality estimation device configured to estimate transmission quality and in which a multi-core fiber having a plurality of cores is used in at least a partial segment of a connection between the nodes, the transmission quality estimation device comprising:
a receiving unit configured to receive transmission quality measurement light dropped from some of the plurality of cores of the multi-core fiber; and
an estimation unit configured to identify a core from which light leaks among the plurality of cores included in the multi-core fiber between the nodes on a basis of the transmission quality measurement light,
wherein the plurality of cores having more than two cores including a first core that transmit at least a communication optical signal and a second core that transmits the transmission quality measurement light including light leaking from the first core, wherein the communication optical signal is modulated such that each of first cores used for transmission can be identified.

17. A transmission quality estimation method executed by a transmission quality estimation system which includes three or more nodes and a transmission quality estimation device configured to estimate transmission quality and in which a multi-core fiber having a plurality of cores is used in at least a partial segment of a connection between the nodes, the transmission quality estimation method comprising:
a core connection step of performing, by a connector of a node of the nodes, dropping, adding, or relaying light transmitted from or to each of the plurality of cores of the multi-core fiber; and
an estimation step of identifying, by the transmission quality estimation device, a core from which light leaks among the plurality of cores included in the multi-core fiber between the nodes on a basis of transmission quality measurement light dropped by the connector,
wherein the plurality of cores having more than two cores including a first core that transmit at least a communication optical signal and a second core that transmits the transmission quality measurement light including light leaking from the first core, wherein the communication optical signal is modulated such that each of first cores used for transmission can be identified.

* * * * *